United States Patent [19]

Tsuboi et al.

[11] Patent Number: 5,182,638
[45] Date of Patent: Jan. 26, 1993

[54] DIGITAL COLOR COPYING MACHINE COMPRISING A TEST MODE FOR MAKING A COLOR ADJUSTMENT

[75] Inventors: Toshio Tsuboi; Shigeru Moriya; Keiji Nakatani, all of Osaka, Japan

[73] Assignee: Minolta Camera Kabushiki Kaisha, Osaka, Japan

[21] Appl. No.: 431,078

[22] Filed: Nov. 3, 1989

[30] Foreign Application Priority Data

Nov. 8, 1988 [JP] Japan .............................. 63-283245

[51] Int. Cl.5 ..................... G03F 3/08; H04N 1/46; H04N 1/00
[52] U.S. Cl. ........................... 358/80; 358/75; 358/401; 358/406
[58] Field of Search ............. 358/75, 75 IJ, 76, 77, 358/78, 80, 406, 443, 448, 450, 451, 452, 453

[56] References Cited

U.S. PATENT DOCUMENTS

| | | | |
|---|---|---|---|
| 3,718,397 | 2/1973 | Smajo | 355/77 |
| 4,275,958 | 6/1981 | Tachika et al. | 355/14 R |
| 4,387,297 | 6/1983 | Swartz et al. | 235/462 |
| 4,603,262 | 7/1986 | Eastman et al. | 250/566 |
| 4,674,861 | 6/1987 | Kawamura | 355/4 |
| 4,755,852 | 7/1988 | Fujita | 355/14 E |
| 4,794,419 | 12/1988 | Shibazaki et al. | 355/3 R |
| 4,825,246 | 4/1989 | Fukuchi et al. | 355/4 |
| 4,875,173 | 10/1989 | Nakajima | 364/518 |
| 4,876,571 | 10/1989 | Nakamura et al. | 355/210 |
| 4,978,226 | 12/1990 | Moriya et al. | 358/76 |
| 4,979,031 | 12/1990 | Tsuboi et al. | 358/80 |

FOREIGN PATENT DOCUMENTS

| | | |
|---|---|---|
| 49-131317 | 12/1974 | Japan . |
| 54-104834 | 8/1979 | Japan . |
| 55-123270 | 9/1980 | Japan . |
| 56-83757 | 7/1981 | Japan . |
| 57-61372 | 4/1982 | Japan . |
| 60-216670 | 10/1985 | Japan . |
| 60-239764 | 11/1985 | Japan . |
| 63-14177 | 1/1988 | Japan . |
| 1-126074 | 5/1989 | Japan . |

*Primary Examiner*—Edward L. Coles, Sr.
*Assistant Examiner*—Thomas D. Lee
*Attorney, Agent, or Firm*—Burns, Doane, Swecker & Mathis

[57] ABSTRACT

A digital color copying machine comprising a test mode is disclosed. In the test mode, image data corresponding to a partial area of an original document indicated is stored in a RAM, and thereafter, the image data stored in the RAM is read out repeatedly, and plural test images for which the color correction is made with different color balances respectively are formed as mosaic monitor images on a recording medium. Then, one of plural test images is selected, and a copy of document having a color balance of the selected test image is produced. The state of the selected color balance is displayed on a display section.

14 Claims, 14 Drawing Sheets

DIGITAL COLOR COPYING MACHINE COMPRISING A TEST MODE FOR MAKING A COLOR ADJUSTMENT

BACKGROUND OF THE INVENTION

1. Field of the Invention

The present invention relates to a digital color copying machine, and more particularly, to a digital color copying machine capable of performing a test mode for making a color adjustment.

2. Description of the Related Art

A conventional digital color copying machine comprises a reading section for reading an image of a document by using a color image sensor and converting the image of the document into image data for printing, and an electrophotographic printer section for printing an image of the document on copying paper according to the image data. In the case that plural color images are to be superimposed on a copying paper, the document is read out repeatedly by the reading section, and each color image is printed on the same copying paper by the printer section in the order of respective colors predetermined.

The reading section comprises a masking circuit for generating a color-corrected signal corresponding to printing characteristics of the printer section. Generally speaking, it is difficult for the masking process circuit to minimize the color difference between the real document and the copy thereof with respect to all the colors contained therein. Therefore, in such a case that a copy is further copied as a document, the color tone of the secondary copy may be considerably different from that of the original document. However, in the range of a limited color tone, if a better color balance adjustment is performed, the variation of the color tone can be minimized.

Conventionally, the color balance adjustment is performed by referring to a copy obtained in a certain color balance in a manner of so-called cut and try. In this case, the scanning operation of the document is repeated by a number of times which is a product of a number of times of the color balance operation needed for obtaining a desired color copy and a number of the printing colors, and therefore, the color balance operation is time consuming and laborious.

Generally, in the conventional digital color copying machine, in order to adjust a color balance upon making a color adjustment, for example, there are set respective color adjustment coefficients of cyan color, magenta color and yellow color. Namely, the above color adjustment coefficients are normally set at predetermined standard levels, respectively, and when a color balance of an image to be printed on a copying paper is altered, respective color adjustment coefficients are set at proper levels, respectively.

The inventors of the present invention have proposed a color adjustment selecting method (referred to as a mosaic monitor method hereinafter) for decreasing the time and cost required for the color correction in the U.S. patent application Ser. No. 321,405 as filed on Mar. 10, 1989. In this mosaic monitor method, a part of a document (referred to as a specific area hereinafter) including a partial image for example, a face of a person, for which the operator desires accurate the color reproduction, is set by a specific area setting means. Then, image data of the specific area is stored in an image memory means. Next, the color adjustment is made for the image data read out from the image memory means with predetermined various color adjustment coefficients, and then image data having different color balance are printed at different positions of the same copying paper in a mosaic-like pattern. Thereafter, the operator selects an image having a color balance nearest to that of a document or an image having a color balance most desirable for the operator among plural images of the specific area (referred to as mosaic monitor images hereinafter) which have been reproduced with different color balances, respectively. Thereafter, a copy of the whole area of document is produced based on the color adjustment coefficients of the mosaic monitor image selected. Thus, a copy of document having the most desirable color balance can be obtained easily.

In this digital color copying machine using the mosaic monitor method, different plural levels of each of the color adjustment coefficients $y_i$, $m_i$ and $c_i$ ($i=1, 2, 3, \ldots$) are set previously, and the color adjustment is made for an image of a partial specific area repeatedly under the condition of plural color balances which have different combinations ($y_i$, $m_j$ and $c_k$) of respective set color adjustment coefficients each other, respectively. Thereafter, the mosaic monitor images comprised of plural test images having different plural color balances each other is printed on a copying paper, and the operator selects an image having the most desirable color balance among the mosaic monitor images. Thus, it becomes easy for the operator to select an image having the most desirable color balance.

However, conventionally, the operator is not informed of respective color adjustment coefficients of the selected color balance.

If respective color adjustment coefficients of the selected color balance are informed brought to the operator's attention it becomes easier to select an image having a preferable color balance among the mosaic monitor images. For example, in the case that the operator wishes to reproduce a document image with substantially complete fidelity, or in the case that the operator wishes to make a minute color adjustment under the condition of a middle level between selectable adjustment levels of each of the color adjustment coefficients, information regarding the color adjustment coefficients becomes helpful to the operator in selecting respective color adjustment coefficients. Further, in the case that plural mosaic monitor images having various sorts of color balances respectively are printed on copying papers in order to search for a desirable color balance, the information of the color adjustment coefficients becomes helpful to the operator in selecting respective color adjustment coefficients on the next trial. Furthermore, even in the case that a proper color balance has been searched among the mosaic monitor images. If respective color adjustment coefficients of the searched color balance are brought to the operator's attention, it is expected that a color balance can be selected more properly by such an experience.

SUMMARY OF THE INVENTION

An object of the present invention is to provide a digital color copying machine comprising a test mode for making a color adjustment which is capable of selecting a desirable color balance from plural color balances and informing a state of the selected color balance to the operator.

Another object of the present invention is to provide an image recording apparatus for forming an image on a recording medium in accordance with image data which is capable of selecting a desirable color balance from plural color balances and informing a state of the selected color balance to the operator.

In order to accomplish the above objects, according to one aspect of the present invention, there is provided a digital color copying machine comprising: image reading means for scanning an original document image and generating image data; color correcting means for making a color correction for said image data; image forming means for forming the original document image on a recording medium in response to the image data corrected by said color correcting means; mode selecting means for selecting a test mode; area indicating means for indicating a partial area of the original document image; memory means for storing the image data corresponding to the partial area indicated by said area indicating means; control means for controlling said image forming means so as to form plural test images of the indicated partial area having different color balances on said recording medium by reading out said image data stored in said memory means when the test mode is selected and applying said read out image data to said color correcting means in order to make a color correction thereof with a color balance selected among predetermined color balances; image selecting means for selecting any one of plural test images formed by said control means; and indicating means for indicating the state of the color balance with which the color correction is made for one of plural test images selected by said image selecting means.

According to another aspect of the present invention, there is provided the digital color copying machine further comprising: altering means for altering the color balance indicated by said indicating means; one more control means for controlling said color correcting means so as to make the color correction for the entire original document image with the color balance altered by said altering means, thereby performing a copying operation under the condition of the altered color balance; and one more indicating means for indicating the state of the color balance altered by said altering means.

According to a further aspect of the present invention, there is provided the digital color copying machine wherein said test image forming means forms plural test images of the partial specific area for which the color adjustment is made with different color balances in a form of a matrix on the same recording medium.

According to a still further aspect of the present invention, there is provided an image recording apparatus for forming an image on a recording medium in accordance with image data which comprises: color adjusting means for making different color adjustments for the image data and generating adjusted image data having different color balances; image forming means for forming plural test images respectively having different color balances at different positions of a recording medium in accordance with the image data adjusted by said color adjusting means; image selecting means for selecting any one of plural test images formed by said image forming means; means for controlling said color adjusting means so as to make the color adjustment for the entire original document image with a color balance with which the color adjustment is made for one of plural test images selected by said image selecting means, thereby performing a copying operation under the condition of the selected color balance; and indicating means for indicating the state of the color balance with which the color correction is made for one of plural test images selected by said image selecting means.

BRIEF DESCRIPTION OF THE DRAWING

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1:
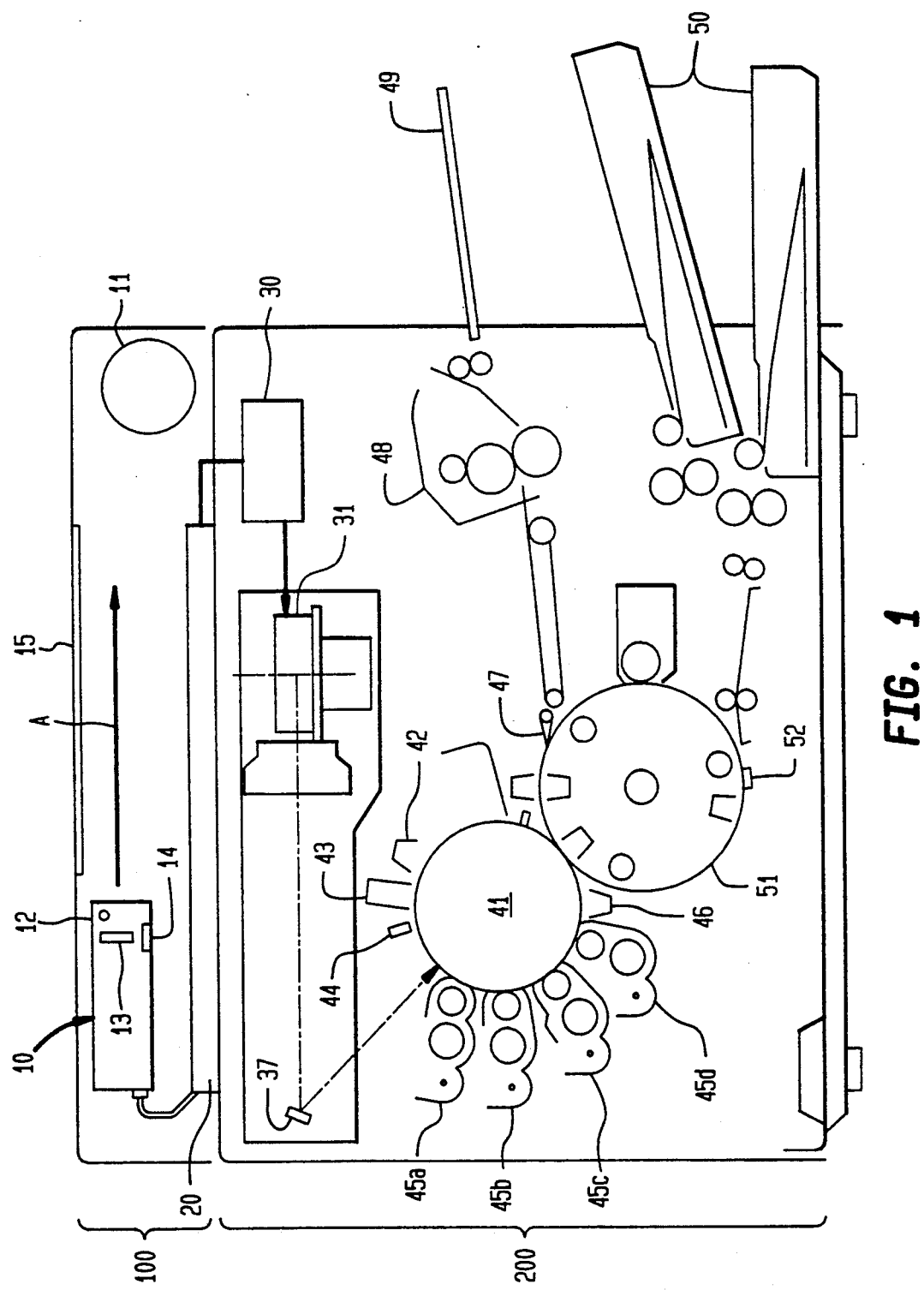
FIG. 1 is a schematic longitudinal cross sectional view of a digital color copying machine of a preferred embodiment according to the present invention.

A digital color copying machine of a preferred embodiment according to the present invention will be described below in the order of the following items, with reference to the attached drawings.

(1) Composition of the digital color copying machine (2) Action of mosaic monitor and color correction adjustment function (3) Color tone setting circuit (4) Image memory circuit (5) Display of a state of a selected color balance (6) Control flow in the mosaic monitor mode The present invention particularly relates to the description of the above paragraphs (2) and (5).

(1) Composition of the digital color copying machine

A digital color copying machine of the preferred embodiment according to the present invention comprises a reading section 100 for reading an image of a document using an image sensor and converting the image of the document into image data, and a printer section 200 for printing the image corresponding to the image data on a copying paper using the electrophotographic process.

In the copy machine, a multi-color copy is obtained by repeating an image reading process by the image reading section 100 and an image forming process by the printer section 200 with respect to each of printing colors. That is, the reading section 100 reads the image of the document corresponding to respective colors of yellow, magenta and cyan, respectively, and outputs respective color image data to the printer section 200. The printer section 200 forms respective color images according to respective color image data outputted from the reading section 100. Thus, respective color images are superimposed on a copying paper so as to form a color image.

FIG. 1 shows the whole composition of the digital color copying machine of the preferred embodiment according to the present invention.

Referring to FIG. 1, a scanner 10 comprises an exposure lamp 12 for illuminating the document, a rod lens array 13 for condensing the light reflected from the document, and a CCD color image sensor 14 for converting the condensed light into an electrical signal. The scanner 10 is moved in a direction indicated by an arrow A by a motor 11 upon reading the document so as to scan the document set on a platen 15. The image of the document illuminated by a light source is converted into multi-level analogue electric signals of red color, green color and blue color by the CCD color image sensor 14.

The analogue electric signals outputted from the CCD color image sensor 14 are converted into binary image data corresponding to each of an yellow color image, a magenta color image and a cyan color image of the document, and individual color image data are stored in a buffer memory 30.

Figure 2:
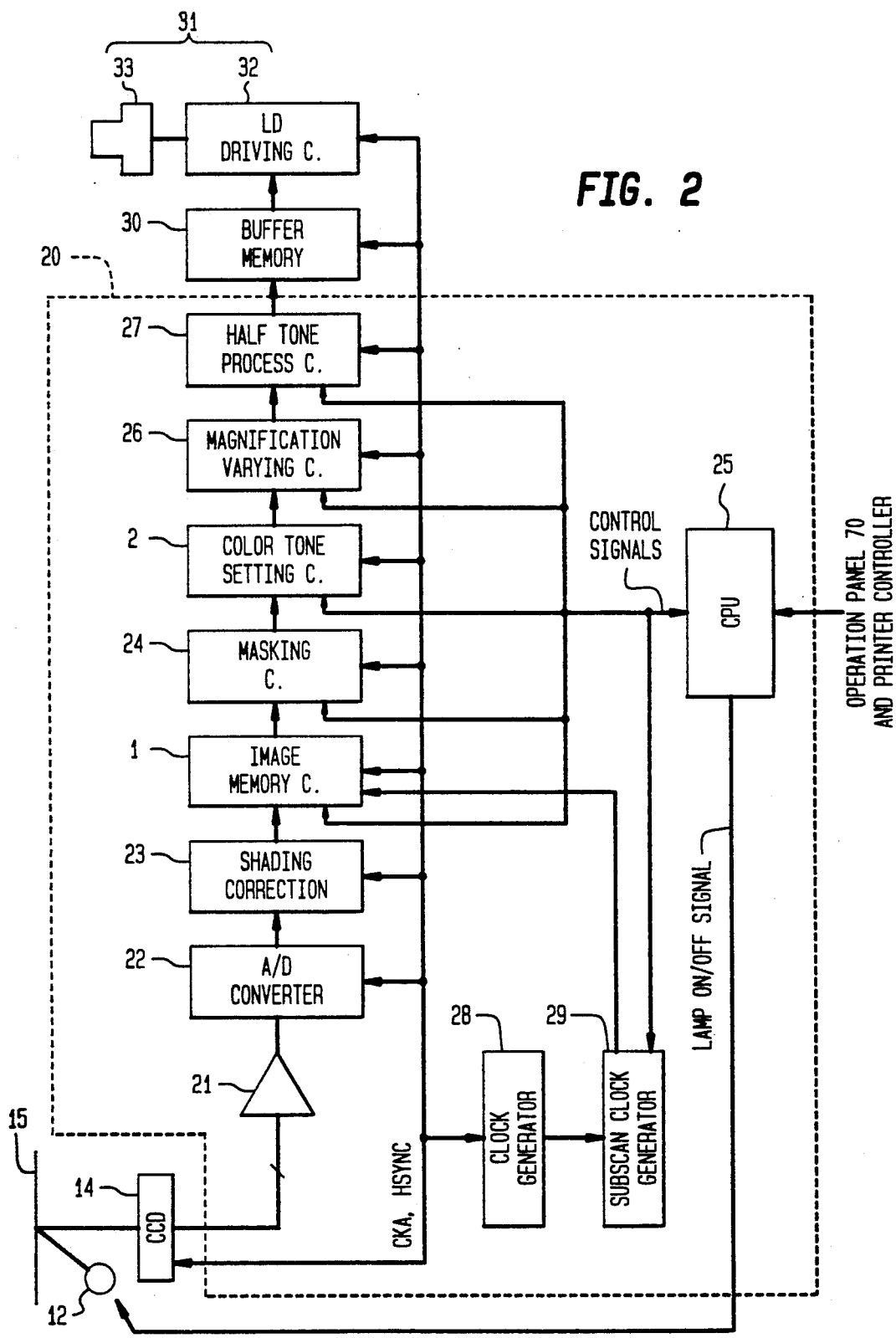
FIG. 2 is a schematic block diagram of a signal processing section shown in FIG. 1.

Referring to FIG. 2, a print head 31 comprises of an LD driving circuit 32 and a semiconductor laser (LD) 33. The LD driving circuit 32 drives the semiconductor laser 33 according to the image data read out from the buffer memory 30.

Referring back to FIG. 1, a laser beam generated from the semiconductor laser 33 is swept in the axial direction of a photoconductive drum 41 by an optical means (not shown) such as a polygon mirror, and is projected onto the surface of the rotating photoconductive drum 41 through a reflection mirror 37. Then, the image of the document is formed on the surface of the photoconductive drum 41. Before the photoconductive drum 41 is projected by the above laser beam, it is illuminated by an eraser lamp 42, is electrified by a corona charger 43, and furthermore, is illuminated by an eraser lamp 44. Thereafter, the above laser beam is projected onto the surface of the photoconductive drum 41 so as to form an electrostatic latent image thereon. After either one of an yellow color toner developing unit 45a, a magenta color toner developing unit 45b, a cyan color toner developing unit 45c and a black color toner developing unit 45d is activated, the electrostatic latent image formed on the surface of the photoconductive drum 41 is developed into a visible toner image. The developed visible toner image is transferred onto a copying paper which is wound around a transfer drum 51.

The image forming process is repeated with respect to four colors (yellow, magenta, cyan and black) so as to form a color image on a copying paper wound around the transfer drum 51. The scanner 10 is driven in synchronous with the rotations of the photoconductive drum 41 and the transfer drum 51 in the image forming process. Thereafter, a separating nail member 47 is enabled so that the copying paper is separated from the transfer drum 41, and thereafter, the copying paper is fixed by a fixing unit 48 and is discharged to a paper discharging tray 49.

It is to be noted that, the copying paper is fed from a paper cassette 50, and the edge of the copying paper is chucked by a chucking mechanism 52 which is arranged around the transfer drum 51 so as to prevent an image from being shifted upon transferring the toner image thereon.

FIG. 2 shows a signal processing section 20 for processing the analogue electric signals outputted from the CCD color image sensor 14 so as to output the binary image signals corresponding to the electric signals.

Referring to FIG. 2, in the normal image forming process, the analogue image signals outputted from the CCD color image sensor 14 are converted into electric signals corresponding to the density of the image by a logarithmic amplifier 21, and the electric signal outputted from the amplifier 21 is converted into multi-level digital data by an analogue to digital converter (referred to as an A/D converter hereinafter) 22. A shading correction is performed with respect to individual image data of red color, green color and blue color by a shading correction circuit 23. In a mosaic monitor mode (MMM) as described later, the image data outputted from the shading correction circuit 23 is stored in an image memory circuit 1. On the other hand, in a normal print mode for forming a normal color image on a copying paper, the image memory circuit 1 is disabled, and the image data outputted from the shading correction circuit 23 is directly to a masking circuit 24.

Respective image data of red color, green color and blue color are processed in parallel in the above data processing. Thereafter, the masking circuit 24 generates image data of one printing color of yellow color, magenta color, cyan color and black color from the image data of red color, green color and blue color according to the characteristics of the printing toner designated, wherein the printing color is determined in response to a control signal input from a CPU 25.

The masking circuit 24 comprises a background color rejecting circuit for rejecting color data on a background surface of the image to be processed, and a black color data generating circuit for generating black color data upon scanning black color image.

In the case that the color balance is to be altered in the mosaic monitor mode and the normal print mode, the color tone setting circuit 2 performs the color correction for the image data outputted from the masking circuit 24, and outputs the corrected image data to a magnification varying circuit 26. On the other hand, in the case that the color balance is kept unchanged, the color tone setting circuit 2 is disabled, and therefore, the color correction is not performed. Then, the image data outputted from the masking circuit 24 is directly sent to the magnification varying circuit 26.

The magnification varying circuit 26 electrically processes the image data outputted from the masking circuit 24 or the color tone setting circuit 2 so as to vary the magnification of the image in the main scan direction by a well known manner, and output the generated image data to a half tone processing circuit 27. On the other hand, the magnification in the subscan direction is varied by varying the velocity of the scanner 10 for scanning the document.

The half tone processing circuit 27 binarizes the image data outputted from the magnification varying circuit 26 so as to generate the binary pseudo half tone signals and store them in the buffer memory 30. The LD driving circuit 32 drives the semiconductor laser 33 so as to generate a laser beam according to the pseudo half tone signals outputted from the buffer memory 30.

On the other hand, a clock generator 28 generates a horizontal synchronizing signal Hsync and a clock signal CKA for synchronizing the reading action of the CCD color image sensor 14 with the image data processing of respective circuits of the signal processing section 20. Furthermore, a subscan clock generator 29 for varying the magnification generates a subscan clock for varying the magnification which is an interruption signal for outputting to the image memory circuit 1 in accordance with a control signal outputted from the CPU 25.

The composition of the CPU 25 and the peripheral input and output units will be described later with reference to FIG. 6.

Figure 3:
FIG. 3 is a timing chart showing an action of the signal processing section shown in FIG. 2.

FIG. 3 shows a timing chart of the image data which is processed in the signal processing section 20.

Referring to FIG. 3, the horizontal synchronizing signal Hsync and the clock signal CKA are generated by the clock generator 28, and the CCD color image sensor 14 outputs the image data of red color, green color and blue color in serial in synchronous with the clock signal CKA. In FIG. 3, the numerals indicated in the individual image data denote addresses in the main scan direction. Every time the horizontal synchronizing signal Hsync is generated, the line n in the main scan direction is renewed. Then, the scanner 10 is moved in the subscan direction by a unit distance.

The digital color copying machine of the present preferred embodiment comprises a color correction function which is performed in the mosaic monitor mode, and a superimposing function for superimposing one image on another image. In order to perform the above functions, a memory for storing image data is required. Since there are a number of image processing common to both the above functions, both of the image memory circuit 1 for storing image data and the color tone setting circuit 2 are used and are controlled by the CPU 25 upon performing the above functions. It is to be noted that the detailed description of the superimposing function is omitted therein since the superimposing function is disclosed in the other U.S. applications applied by the present applicant and is well known to those skilled in the art.

Figure 4:
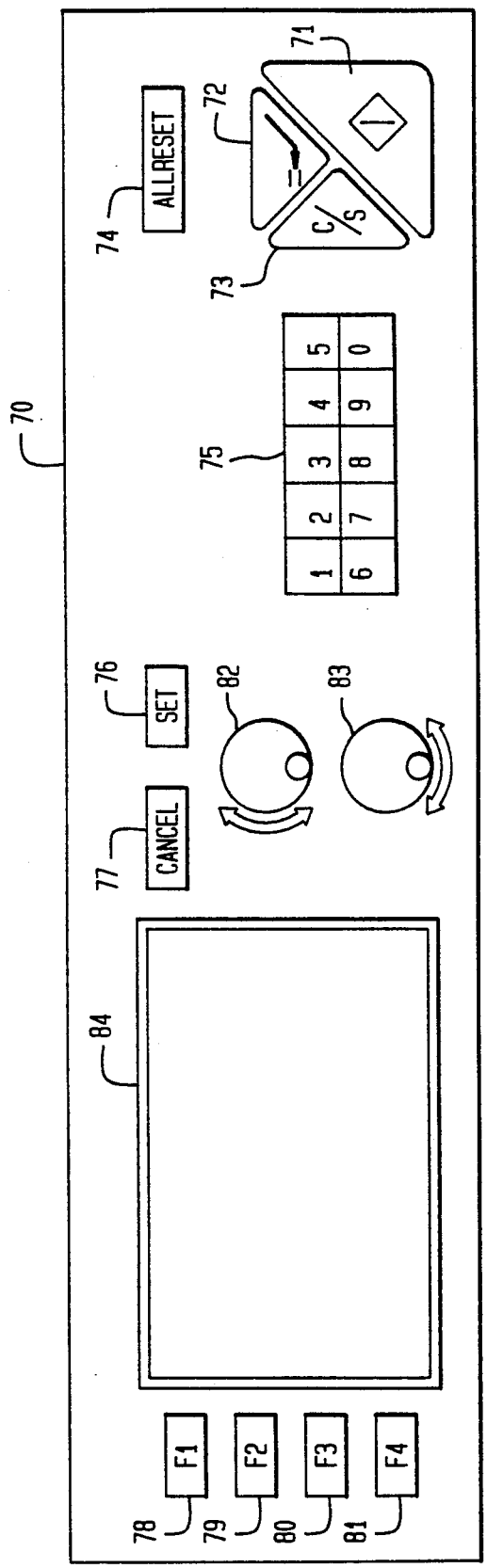
FIG. 4 is a top plan view of an operation panel of the digital color copying machine shown in FIG. 1.

FIG. 4 shows an operation panel 70 arranged on the main body of the copying machine.

Referring to FIG. 4, on the operation panel 70, there are arranged a print start key 71 for starting the copying operation, an interruption key 72 for instructing an interruption copying operation, a clear stop key 73, an all reset key 74, a set of ten keys 75, a set key 76, a cancel key 77, various kinds of function keys 78 to 81, jog dials 82 and 83 for setting the areas which are described later, a liquid crystal display section 84 for displaying the image of the document so as to set the above areas and displaying a state of a color balance selected as described later and various kinds of messages. The function keys 78, 79 and 80 are selecting keys for selecting the mosaic monitor mode and a superimposing mode, and a density correction key, respectively. It is to be noted that the all reset key 74 is also used for clearing data stored in a mode memory 36.

Figure 5:
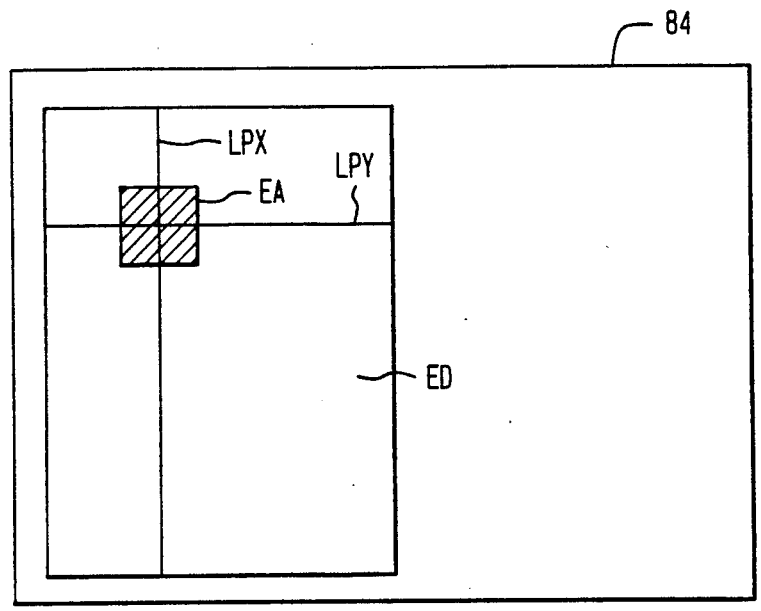
FIG. 5 is a front view of a display section of the operation panel shown in FIG. 4 upon setting a specific area thereon.

In the mosaic monitor mode described later in detail, the areas such as specific area etc. are set as follows. For example, in the case of setting the specific area, as shown in FIG. 5, a document is set on the platen 15, and a preparatory scan is performed by the scanner 10, and then, the image of the document is roughly displayed on the document area ED of the display section 84 of the operation panel 70. As shown in FIG. 5, the intersection between a longitudinal instructing line LPX and a lateral instructing line LPY corresponds to the center of the square specific area EA. When the jog dials 82 and 83 are rotated, the instructing lines LPX and LPY are moved in the longitudinal direction and the lateral direction, respectively. Therefore, the specific area EA is set by rotating the jog dials 82 and 83, and the set key 76 is pushed down, so that the specific area is set.

Figure 6:
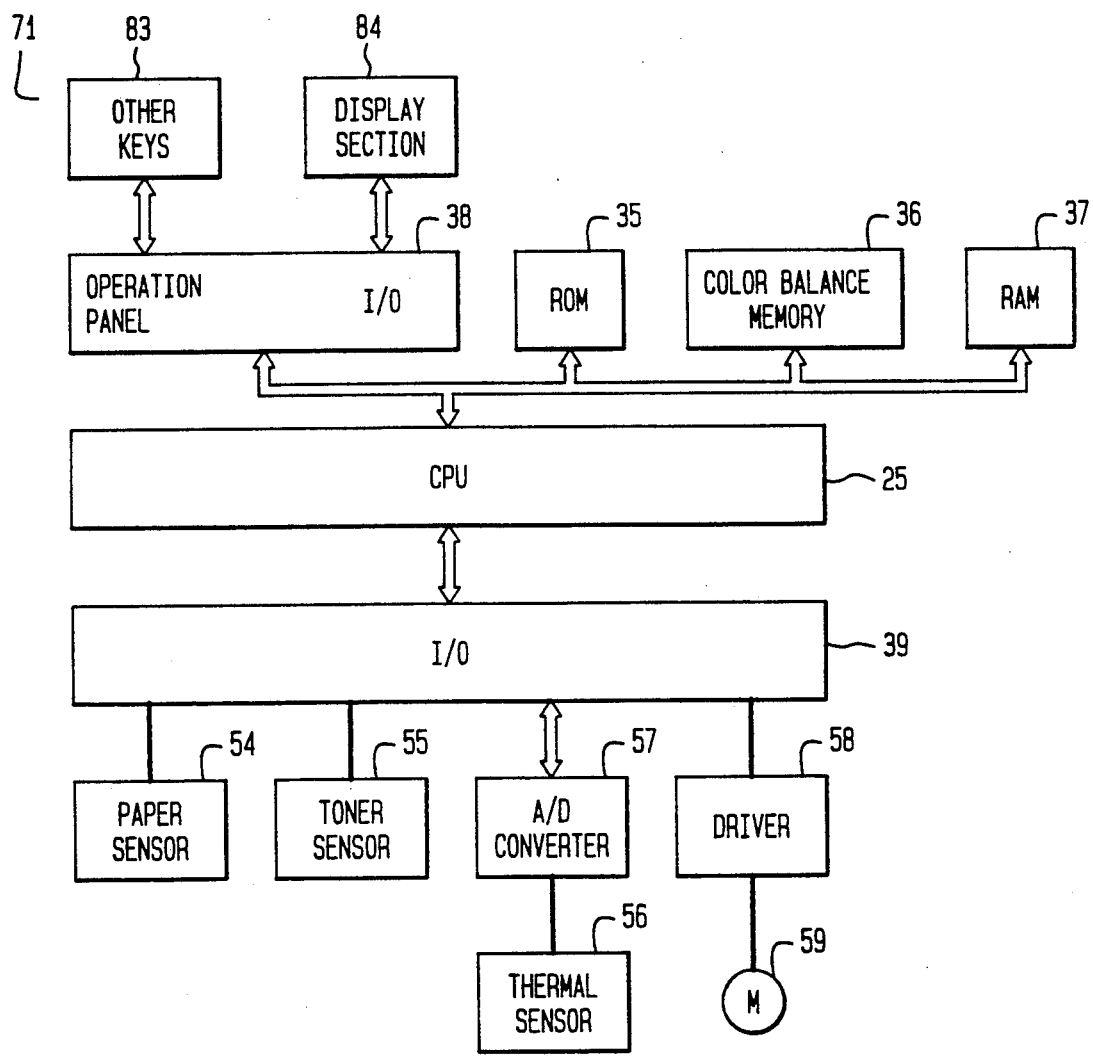
FIG. 6 is a schematic block diagram of a CPU and peripheral input and output units in the digital color copying machine shown in FIG. 1.

The CPU 25 controls not only the action of the image processing section 20 but also the action of the operation panel 70 and the printing operation, as shown in FIG. 6. The CPU 25 is connected to a ROM 35, a color balance memory 36 of a RAM, a RAM 37 used as a working area for the CPU 25 and an operation panel input and output port circuit 38.

The color balance memory 36 is used for storing data of respective color adjustment coefficients of color balance selected in the mosaic monitor mode, as described in detail later. Further, the operation panel input and output port circuit 38 is connected to various kinds of keys 71 to 83 of the operation panel 70 and the display section 84 thereof.

The CPU 25 is connected to a paper sensor 54 and a toner sensor 55 which are used for controlling the copying operation through an input and output port circuit 39, and a thermal sensor 56 for measuring the temperature within the copying machine through the input and output port circuit 39 and an analogue to digital converter 57. Furthermore, the CPU 25 drives a motor 59 used for the copying operation through a driver 58.

(2) Action of mosaic monitor and color correction adjustment function

The mosaic monitor is performed by the image memory circuit 1 for storing the image data of the specific area EA and the color tone setting circuit 2 for performing the color correction in a printing process.

The mosaic monitor mode is selected when the function key 78 of the operation panel 70 is pushed down. The mosaic monitor is to make various color corrections for the image of the specific area EA set by the operator and print images of the specific area EA having different color balances (referred to as mosaic monitor images hereinafter) on the same copying paper. Therefore, an image having a desirable color balance can be selected by observing the mosaic monitor images. That is, when the operator selects an image having a desirable color balance among the mosaic monitor images by operating a key on the operation panel 70, the color adjustment coefficients for the color adjustment of the selected image are automatically set, and thereafter, the printing operation is performed by using the selected color adjustment coefficients.

In the mosaic monitor mode, first of all, a specific area EA for which the color adjustment is made (for example, an area indicated by oblique lines) is set with looking at the image of the document displayed on the display section 84 of the operation panel 70 which has been obtained in the above preparatory scan process.

Figure 10:
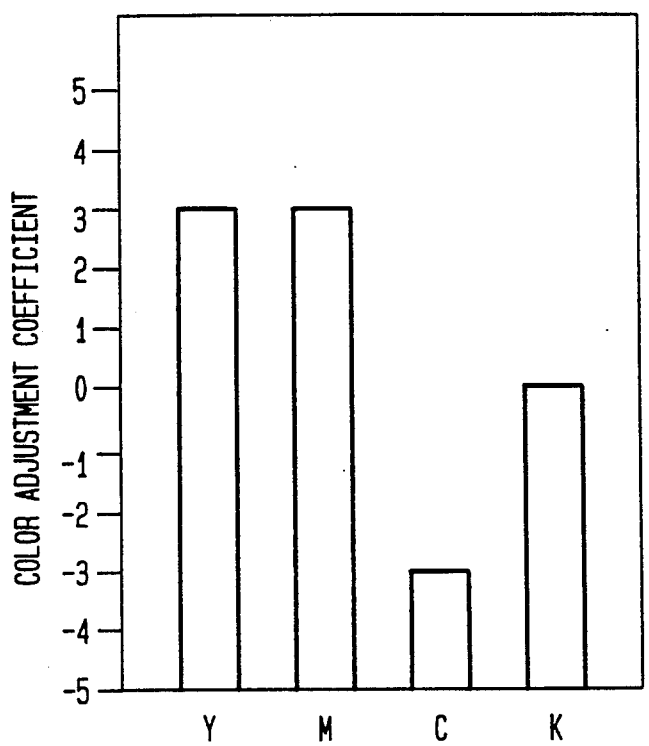
FIGS. 10 and 11 are front views of bar graphs of a color balance displayed on the display section shown in FIG. 4.

When the specific area EA is set, the image memory circuit 1 stores only image data I corresponding to the specific area EA in a RAM 401 shown in FIG. 10. It is to be noted that the upper limit of the size of the specific area EA is predetermined according to the memory capacity of the RAM 401.

Thereafter, the color tone setting circuit 2 performs various kinds of color correction for the image data I which is outputted from the image memory circuit 1 and is converted into the image data of printing color so as to generate printing image data $I'=KI(k=Ky, Km, Kc)$, wherein the coefficients Ky, Km and Kc are the color adjustment coefficients k for yellow color, magenta color and cyan color, respectively.

Figure 7:
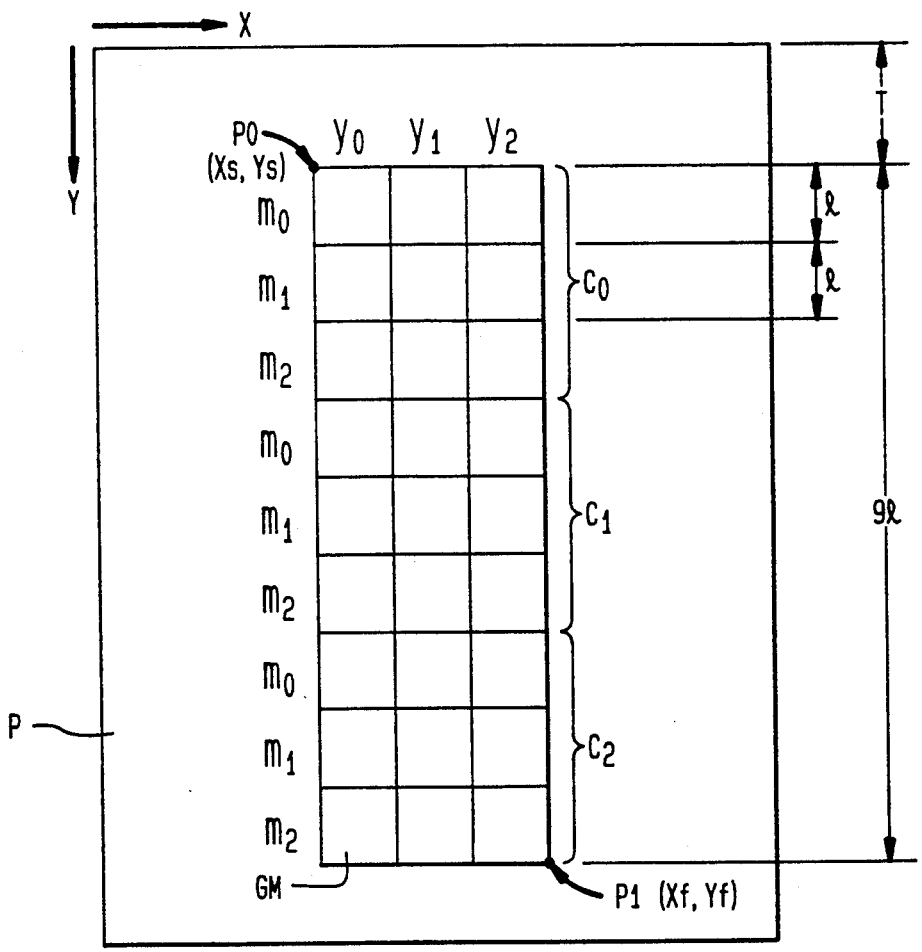
FIG. 7 is a front view of an output format of a mosaic monitor image displayed on the display selection shown in FIG. 4.

FIG. 7 shows one example of the output format of the printing image data $I'$.

Referring to FIG. 7, three kinds of color adjustment coefficient $Ky=y_i$, $Km=m_i$ and $Kc=c_i$ (i=0, 1, 2) are used for three colors of cyan color (c), yellow magenta color (m) and yellow color (y), and then, 27 kinds images ($3\times3\times3=27$) are outputted. The color adjustment coefficients $c_1$, $m_1$ and $y_1$ represent standard values of cyan, magenta and yellow colors, respectively, the color adjustment coefficients $c_0$, $m_0$ and $y_0$ represent values each of which is a product of the standard value and a predetermined factor smaller than one, and the color adjustment coefficients $c_2$, $m_2$ and $y_2$ represent values of cyan, magenta and yellow colors, each of which is a product of the standard value and another predetermined factor larger than one.

In the present preferred embodiment, the color adjustment coefficients $y_0$, $y_2$, $m_0$, $m_2$, $c_0$ and $c_2$ are set by using the standard coefficients $y_1$, $m_1$ and $c_1$, and a constant $a_0$.

$y_0=y_1-a_0$
$y_2=y_1+a_0$
$m_0=m_1-a_0$
$m_2=m_1+a_0$
$c_0=c_1-a_0$
$c_2=c_1+a_0$

The operator selects a suitable color tone among 27 kinds of mosaic monitor image GM shown in FIG. 7, and then, the process of the mosaic monitor mode is completed.

In the case that the operator specifies a desirable color tone from the mosaic monitor image GM, for example, the function keys 78 to 81 are operated according to a message displayed on the display section 84 of the operation panel 70 so as to select one image from the mosaic images GM, and thereafter, the color balance for processing an image is specified. Otherwise, after making the image block shown in FIG. 7 display on the display section 84, the function keys 78 to 81 and the ten key 75 may be operated so as to select one of the mosaic images GM, and then, a desirable color balance may be selected.

Next, the image of the document is read out again by the reading section 100, and then, the image having the set color tone is printed by the printer section 200.

(3) Color tone setting circuit

Figure 8:
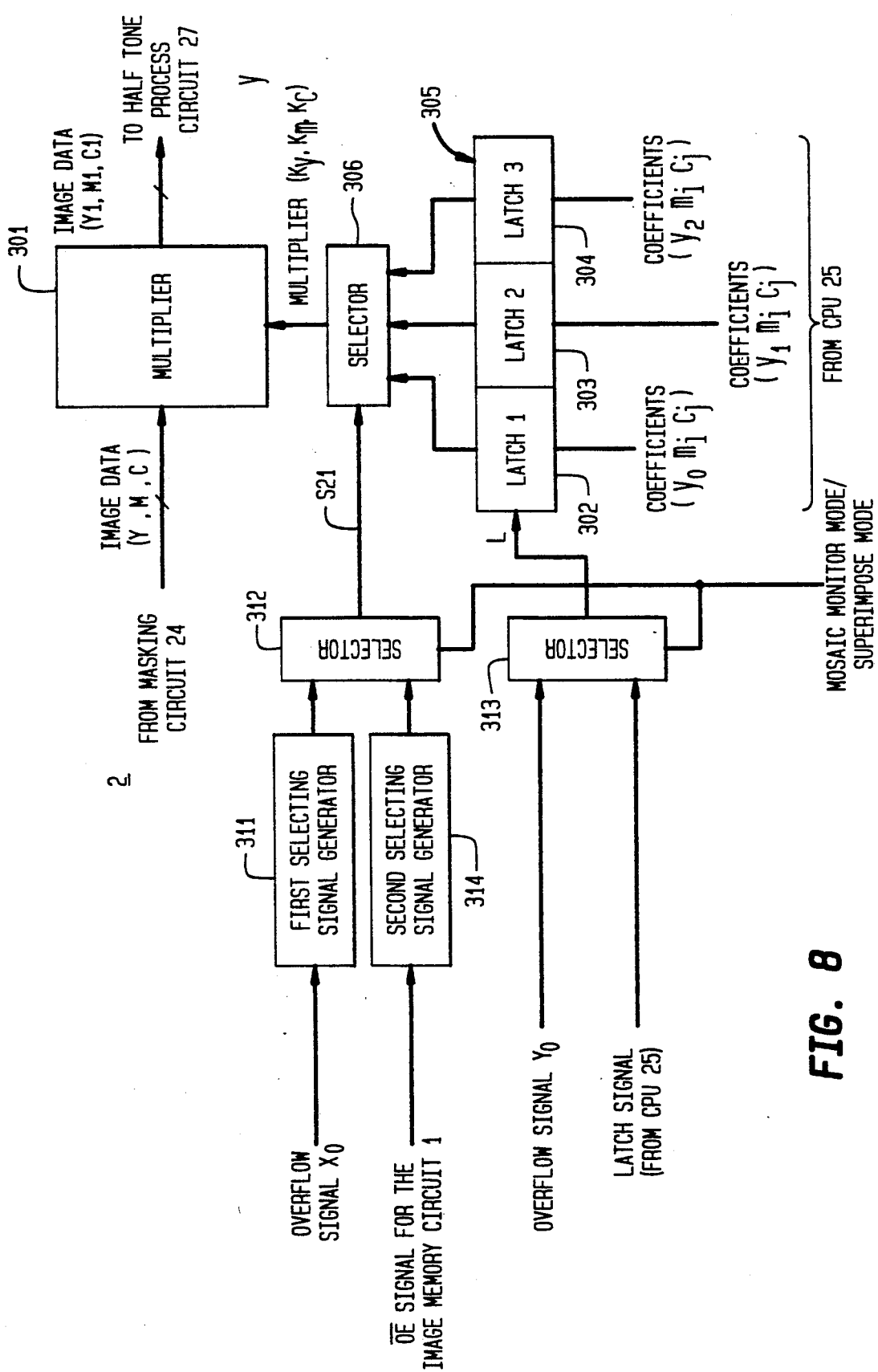
FIG. 8 is a schematic block diagram of a color tone setting circuit shown in FIG. 2.

FIG. 8 is a circuit diagram of the color tone setting circuit 2.

The color tone setting circuit 2 is arranged at the next step of the masking circuit 24, and makes the color adjustment in the mosaic monitor mode.

The masking circuit 24 converts respective image data of red color, green color and blue color into image data Y, M, C and K for printing which correspond to respective printing colors of yellow color, magenta color, cyan color and black color, and outputs the converted image data to the color tone setting circuit 2.

The well known conversion equation for converting the original image data R, G and B into the printing image data Y, M and C is expressed as follows:

$$\begin{bmatrix} Y \\ M \\ C \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} B \\ G \\ R \end{bmatrix}$$

Respective conversion coefficients $a_{00}$ to $a_{22}$ are predetermined at proper values according to the theory and the result of the experiment so that the color image reflecting that of the original document faithfully can be obtained.

In the color adjustment of the color tone setting circuit 2, the following multiplications are performed for respective image data Y, M and C calculated by the above calculation in order to obtain adjusted printing image data $Y_1$, $M_1$ and $C_1$.

$Y_1=K_y\times Y$,
$M_1=K_m\times M$,
$C_1=K_c\times C$, wherein $K_y$ is the color adjustment coefficient of yellow color, Km is the color adjustment coefficient of magenta color, and Kc is the color adjustment coefficient of cyan color.

It is to be noted that the printing image data K of black color is outputted for a picture element only when all the respective image data of yellow color, magenta color and cyan color are outputted since it is not necessary to make the color adjustment.

In the mosaic monitor mode, different sets of color adjustment coefficients are applied to respective blocks shown in FIG. 7. That is, the reading area designated by the coordinates $P_0$ ($x_s$, $y_s$) and $P_1$ ($x_f$, $y_f$) is divided into 27 blocks of three rows in the main scan direction X and nine columns in the subscan direction Y, and different sets of color adjustment coefficients are set at respective blocks. In this case, the color adjustment coefficient Ky of yellow color does not vary in the subscan direction Y, however, the coefficient Ky varies in the main scan direction X so that three kinds of coefficients $y_0$, $y_1$ and $y_2$ are set at the three blocks in the main scan direction X, respectively. The color adjustment coefficient Km of magenta color does not vary in the main scan direction X, however, the coefficient Km varies in the subscan direction Y in the order of $m_0$, $m_1$, $m_2$, $m_0$, $m_1$, ... every block. The color adjustment coefficient Kc of cyan color does not vary in the main scan direction X, however, the coefficient Kc varies in the subscan direction Y every three blocks in the order of $c_0$, $c_1$ and $c_2$.

Therefore, the color tone setting circuit 2 sets the color adjustment coefficients every block of the mosaic monitor image as described above, for respective printing image data Y, M and C in the mosaic monitor mode, and outputs the adjusted printing image data to the magnification varying circuit 26.

Referring to FIG. 8, a multiplexer 301 calculates the aforementioned printing image data $Y_1$, $M_1$ and $C_1$ by using the above equations from the image data Y, M and C input from the masking circuit 24, and outputs the printing image data $Y_1$, $M_1$ and $C_1$ to the half tone process circuit 27. There is provided a latch circuit 305 comprised of three latches 302, 303 and 304 for respectively latching respective three coefficients in the main scan direction X in the mosaic monitor mode, which are input from the CPU 25. Three coefficients latched in the latch circuit 305 correspond to three blocks in the main scan direction X, respectively. Every time a subscan clock signal for varying the magnification is input to the CPU 25 as the interruption signal, the CPU 25 performs an interruption process shown in FIGS. 15a and 15b, and the CPU 25 outputs a latch signal to the color tone setting circuit 2 every block in the subscan direction Y so as to make the latches 302, 303 and 304 latch respective new three coefficients for the next three blocks in the subscan direction Y.

The reason why the above latch circuit 305 comprised of three latches 302, 303 and 304 are provided is that the alteration period of the above coefficients in the main scan direction is relatively shorter than the operation period of the CPU 25, and it is difficult for the CPU 25 to set the above coefficients in the latches 302, 303 and 304 at real time. It is to be noted that, in the case of n kinds of color adjustment coefficients, n latches may be provided in parallel.

The image memory circuit 1 outputs an overflow signal $X_0$ (See FIG. 9) in the main scan direction generated upon reading out the image data stored in an image memory 401 to a first selecting signal generator 311. Every time the first selecting signal generator 311 receives the overflow signal $X_0$, i.e., every time the read operation of each block of the mosaic monitor image is completed, the first selecting signal generator 311 outputs a signal S21 to a selector 306 through a selector 312 so that the selector 306 connects the multiplier 301 selectively to respective latches 302 to 304. In the mosaic monitor mode, the selector 312 outputs the signal S21 input from the first selecting signal generator 311 to the selector 306. In accordance with the signal S21, the selector 306 sends one of respective coefficients latched in the latches 302 to 304 of the latch 305 to the multiplier 301 selectively every block.

On the other hand, the image memory circuit 1 outputs an overflow signal $Y_0$ (See FIG. 9) in the subscan direction generated upon reading out the image data stored in the image memory 401 to the selector 313. In the mosaic monitor mode, the selector 313 outputs the overflow signal $Y_0$ to the latch circuit 305. In accordance with the overflow signal $Y_0$, the latches 302 to 304 latch a set of color adjustment coefficients input from the CPU 25 so as to renew them. That is, as soon as the blocks to be processed are changed in the subscan direction to the next blocks, the set of color adjustment coefficients are altered.

In the mosaic monitor mode, when the operator selects a desirable set of color adjustment coefficients, the selected set of color adjustment coefficients may be set in the latch 302, and may be outputted to the multiplier 301.

In the superimposing mode, the selector 312 outputs a signal input from the second selecting signal generator 314 to the selector 306 so that the color tone of the area on which an image is superimposed can be different from that of the other area. Since this is well known to those skilled in the art, the description thereof is omitted therein.

(4) Image memory circuit

Figure 9:
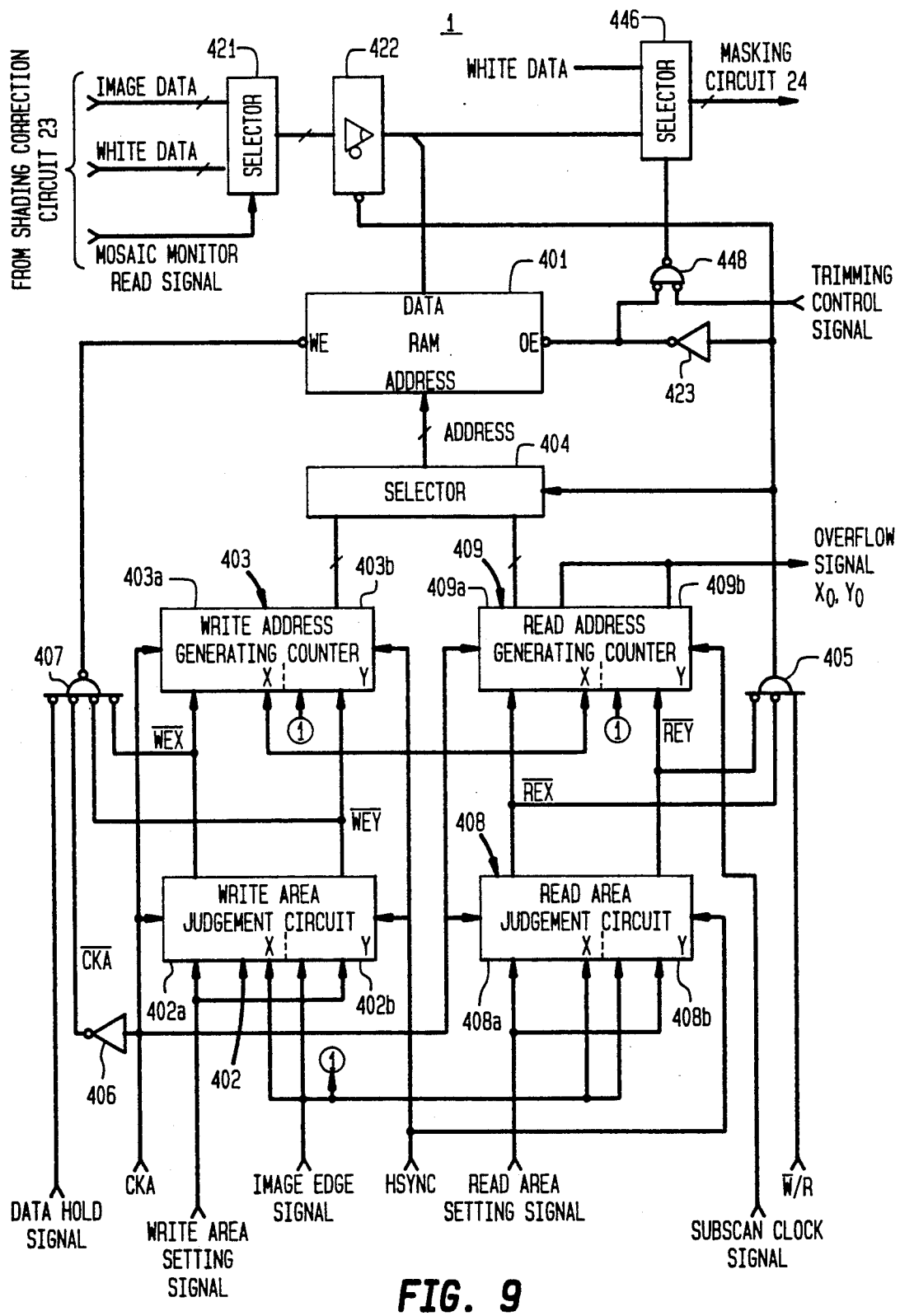
FIG. 9 is a schematic block diagram of an image memory circuit shown in FIG. 2.

FIG. 9 shows the image memory circuit 1 for storing an image of a specific area EA of a document (referred to as a registered image hereinafter) in the mosaic monitor mode, and for reading out the registered image to be printed on any specific position of a copying paper in order to print the registered image as the mosaic monitor image.

Referring to FIG. 9, the RAM 401 is provided for storing image data of the specific area EA. A selector 421 selects either one of image data which is processed with the shading correction in the shading correction circuit 23 and white data input from the shading correction circuit 23 in accordance with the mosaic read signal input from the shading correction circuit 23, and outputs the selected data to the RAM 401 and a selector 446 through a three-state buffer amplifier 422. The output terminal of three-state buffer amplifier 422 is made a high impedance state only when the registered image is read out from the RAM 401 (i.e., $\overline{OE}$="1") upon printing the mosaic monitor image, and in the other cases, i.e., when the mosaic monitor image is not printed in the mosaic monitor mode, the three-state buffer amplifier 422 outputs white data. Furthermore, when image data of a specific area EA of a document is stored in the RAM 401 in the mosaic monitor mode, the three-state buffer amplifier 422 outputs the image data to the RAM 401.

In the mosaic monitor mode, in order to make a color adjustment for the registered image data, the image data is stored in the RAM 401 temporarily by using the selector 446 and the three-state buffer amplifier 422 before the processes performed by the circuits 24, 25, 26 and 27. After the image data is read out from the RAM 401, various kinds of color adjustments are made for the mosaic monitor image, and the color-adjusted mosaic monitor image is printed on a copying paper.

A write area judgment circuit 402 judges whether or not the image data read by the reading section 100 is within a write area in the main scan direction X and in the subscan direction Y in accordance with write area setting signals in the main scan direction X and in the subscan direction Y which are input from the CPU 25. When the image data read by the reading section 100 is within the above write area, the write area judgment circuit 402 outputs Low level signals $\overline{WEX}$ and $\overline{WEY}$ to inverted input terminals of an AND gate 407 and a write address generating counter 403. The AND gate 407 outputs the clock signal $\overline{CKA}$ to a write enable terminal $\overline{WE}$ of the RAM 401 in accordance with the Low level signals $\overline{WEX}$ and $\overline{WEY}$, so as to store the image data in the RAM 401.

Similarly, a read area judgment circuit 408 judges whether or not the image data read by the reading section 100 is within a read area in the main scan direction X and in the subscan direction Y in accordance with read area setting signals in the main scan direction X and in the subscan direction Y which are input from the CPU 25. When the image data read by the reading section 100 is within the above read area, the read area judgment circuit 408 outputs Low level signals $\overline{REX}$ and $\overline{REY}$ to inverted input terminals of an AND gate 405 and a read address generating counter 409. The above read area is predetermined according to the output format.

In accordance with Low level signals $\overline{REX}$ and $\overline{REY}$, The AND gate 405 outputs a read signal $\overline{W/R}$ to an output enable terminal $\overline{OE}$ of the RAM 401 through an inverter 423, i.e., a Low level signal is input to the output enable terminal $\overline{OE}$ of the RAM 401 so that the reading operation of the RAM 401 is enabled.

The write address generating counter 403 generates a write address for storing image data in the RAM 401 in accordance with the clock signal CKA, the horizontal synchronizing signal Hsync, and the above signals $\overline{WEX}$ and $\overline{WEY}$, and outputs the generated write address to the address terminal of the RAM 401 through a selector 404. Similarly, the read address generating counter 409 generates a read address for reading out image data stored in the RAM 401 in accordance with the clock signal CKA, the subscan clock signal, and the above signals $\overline{REX}$ and $\overline{REY}$, and outputs the generated read address to the address terminal of the RAM 401 through the selector 404. The above selector 404 selectively outputs either the write address or the read address to the address terminal of the RAM 401 in accordance with the write/read signal $\overline{W}/R$. It is to be noted that both the write address and the read address are generated as an address of one dimension by a multiplier (not shown) based on an address in the main scan direction X and an address in the subscan direction Y generated by the write address generating counter 403 and the read address generating counter 409, respectively.

The selector 446 and the AND gate 448 are provided to output white data on the area of the superimposing image upon printing the image of the document in the superimposing mode. The detailed description of the selector 446 and the AND gate 448 is omitted since they are not the subject matter of the present invention. Except for the case that a trimming signal is outputted in the superimposing mode, the selector 446 selectively outputs either a signal outputted from the three-state buffer amplifier 442 or a signal outputted from the RAM 401.

The action of the image memory circuit 1 will be described below in detail.

In the case that the registered image is stored in the RAM 401, when the operator specifies a specific area EA of a document using the jog dials 82 and 83 as shown in FIG. 5, the CPU 25 calculates the coordinate $(x_s, y_s)$ of the top left edge of the specific area EA and the coordinate $(x_f, y_f)$ of the bottom right edge thereof in order to determine the ranges of the specific area EA in the main scan direction X and the subscan direction Y, and outputs the above calculated coordinates $(x_s, y_s)$ and $(x_f, y_f)$ as the write area setting signal for representing the write area in the main scan direction X and the subscan direction Y to an X section 402a and a Y section 402b of the write area judgment circuit 402, respectively. The X section 402a and the Y section 402b of the write area judgment circuit 402 count the horizontal synchronizing signal Hsync and the clock signal CKA when the image edge signal is input thereto, and judges whether or not the counting value is within the write area setting area. Then, when the counting value x in the main scan direction X of the X section 402a is within the range from the value $x_s$ to the value $x_f$, i.e., $x_s \leq x \leq x_f$, the X section 402a outputs a Low level signal $\overline{WEX}$ to the X section 403a of the write address generating counter 403. When the counting value y in the subscan direction Y of the Y section 402b is within the range from the value $y_s$ to the value $y_f$, i.e., $y_s \leq y \leq y_f$, the Y section 402b outputs a Low level signal $\overline{WEY}$ to the Y section 403b of the write address generating counter 403. When the write address generating counter 403 judges that the counting values x and y are within the write area, the counter 403 generates a write address and outputs it to the address terminal of the RAM 401 through the selector 404. That is, the X section 403a of the write address generating counter 403 counts the clock signal CKA when the Low level signal $\overline{WEX}$ is input thereto, and generates the counting value as the address in the main scan direction X. The address generated by the X section 403a is cleared in accordance with the horizontal synchronizing signal Hsync. Furthermore, the Y section 403b of the write address generating counter 403 counts the horizontal synchronizing signal Hsync when the Low level signal $\overline{WEY}$ is input thereto, and generates the counting value as the address in the subscan direction Y. The addresses generated by the X section 403a and the Y section 403b are cleared in accordance with the image edge signal which is generated by the CPU 25.

The write address generating counter 403 comprises a multiplier (not shown) and an adder (not shown) for calculating addresses of one dimension, each of which is a product of the address in the main scan direction X generated by the X section 403a and the address in the subscan direction Y generated by the Y section 403b.

In the case that the address of one dimension is generated by the write address generating counter 403 and The image data are stored in the RAM 401, the data hold signal is set at a Low level, and the write/read signal $\overline{W}/R$ is set at a Low level. Then, in accordance with a selecting signal input through the AND gate 405, the selector 404 outputs the address input from the write address generating counter 403 to the address terminal of the RAM 401. Also, the clock signal $\overline{CKA}$ is input to the write enable terminal $\overline{WE}$ of the RAM 401 through the inverter 406 and the AND gate 407 so as to allow the image data to be stored in the RAM 401. Furthermore, since the write/read signal $\overline{W}/R$ is set at a Low level as described above, the Low level write/read signal $\overline{W}/R$ is input to the disable terminal of the buffer amplifier 422 through the AND gate 405, the buffer amplifier 422 is enabled only on the condition that image data of a document is stored in the RAM 401, i.e., the Low level signals $\overline{REX}/0$ and $\overline{REY}$ are outputted from the read area judgment circuit 408 to the AND gate 405, and then, the buffer amplifier 422 outputs the image data to the data terminal of the RAM 401.

Then, only the image data of the area which the write area judgment circuit 402 judges within the specific area in the main scan direction X and in the subscan direction Y can be stored in the RAM 401. When the image data of the above area has been stored in the RAM 401 completely, the CPU 25 outputs the High level data hold signal to the write enable signal $\overline{WE}$ of the RAM 401 through the AND gate 407 so as to inhibit the write operation of the RAM 401, resulting in that the image data is held by the RAM 401.

It is necessary to read out the image data stored in the RAM 401 so as to print mosaic monitor images at the specific read area in the output format shown in FIG. 7. The composition of the circuit for reading out the image data is substantially same as that of the circuit for storing the image data.

The setting values, which can be judged within the range of the specific read area on the condition that $x_s \leq x \leq x_f$ and $y_s \leq y \leq y_f$, are preset by the CPU 25 in the X section 408a and the Y section 408b of the read area judgment circuit 408 for judging a read area on a copying paper, wherein $x_s$ and $y_s$ are an X-coordinate and a Y-coordinate of the top left edge of the specific read area, respectively, and $x_f$ and $y_f$ are an X-coordinate and a Y-coordinate of the bottom right edge thereof, respectively, as shown in FIG. 7. After the image edge signal is input to the read area judgment circuit 408 when the document is scanned, the read area judgment circuit 408 counts the horizontal synchronizing signal Hsync and the clock signal CKA, and also judges whether or not the counting values thereof are within the range of the specific read area. Then, when the counting value in the main scan direction X is within the range of the specific read area, the X section 408a of the read area judgment circuit 408 outputs the Low level signal $\overline{REX}$ to the X section 409a of the read address generating counter 409. When the counting value in the subscan direction Y is within the range of the specific read area, the Y section 408b of the read area judgment circuit 408 outputs the Low level signal $\overline{REY}$ to the Y section 409b of the read address generating counter 409.

When the read area judgment circuit 408 judges that the image data read by the reading section 100 is within the read area, i.e., the Low signals $\overline{REX}$ and $\overline{REY}$ are input to the read address generating counter 409, the read address generating counter 409 generates the read address, and outputs the generated read address to the address terminal of the RAM 401 through the selector 404 since the High write/read signal $\overline{W/R}$ is input to the selector 404 upon reading out the image data stored in the RAM 401. That is, the X section 409a of the read address generating counter 409 counts the clock signal CKA when the Low signal $\overline{REX}$ is input thereto, and generates the address in the main scan direction X. The address generated by the X section 409a is cleared in accordance with the horizontal synchronizing signal Hsync. Furthermore, the Y section 409b of the read address generating counter 409 counts the subscan clock signal input from the subscan clock generator 29 when the Low level signal $\overline{REY}$ is input thereto, and generates the address in the subscan direction. The Y section 409b counts the subscan clock signal in place of the horizontal synchronizing signal Hsync in order to vary the magnification. It is to be noted that the address generated by the Y section 409b is cleared in accordance with the image edge signal generated by the CPU 25. In the read address generating counter 409, the product of the address in the main scan direction X generated by the X section 409a and the address in the subscan direction Y generated by the Y section 409b are calculated by a multiplier (not shown) and an adder (not shown), and the calculated product is outputted as the address of one dimension to the RAM 401 through the selector 404.

The image data read out from the RAM 401 is sent to the masking process circuit 24 through the selector 446. Then, of course, the read address counter 409 generates the address larger than the maximum address of the RAM 401, however, in this case, the X and Y sections 409a and 409b thereof output an overflow signal $X_0$ and an overflow signal $Y_0$ to the color tone setting circuit 2, respectively, every time the counting values of the X and Y sections 409a and 409b thereof become larger than the maximum counting values thereof, and then, the X and Y sections 409a and 409b start to count the values from the initial values again. The overflow signals $X_0$ and $Y_0$ are used for printing a plurality of images respectively having different color tones when the images are arranged in the horizontal direction in the mosaic monitor mode.

Furthermore, since the write/read signal $\overline{W/R}$ becomes a High level upon reading out the image data stored in the RAM 401, the Low write/read signal $\overline{W/R}$ is input to the output enable terminal $\overline{OE}$ of the RAM 401 through the AND gate 405 and the inverter 423, and then, the image data stored in the RAM 401 can be read out in the read area, i.e., in the case of $\overline{REX}$="Low" and $\overline{REY}$="Low". On the other hand, since the Low write/read signal $\overline{W/R}$ is input to the three-state buffer amplifier 422 through the AND gate 405 in the case of $\overline{REX}$="Low" and $\overline{REY}$="Low", the output terminal of the three-state buffer amplifier 422 becomes a High impedance state, and then, the output terminal of the buffer amplifier 422 is separated from the data terminal of the RAM 401.

Furthermore, when image data stored in the RAM 401 can be read out, i.e., $\overline{OE}$="Low", the selector 446 selects the image data read out from the RAM 401 in accordance with the trimming control signal input through the AND gate 448. On the other hand, in the other cases, since it is necessary to read out the image data stored in the RAM 401 so as to print the image of the image data in the output format shown in FIG. 7, the selector 446 selects white data in order to print white color image in the area other of a copying paper than the area where the image of the image data is printed as described above. Then, the coordinates, which the difference between the magnification upon reading out an image of a document and the magnification upon printing the image of the image data stored in the RAM 401 are taken into consideration, are set in the X and Y sections 408a and 408b of the read area judgment circuit 408, respectively. It is to be noted that the period of the subscan clock signal for varying the magnification is varied according to the magnification upon reading out an image of a document.

In the case that the images of 3×9 blocks are printed as shown in FIG. 7, the image data is read out from the RAM 401 in a following manner. That is, the image data of the same line is read out in the main scan direction X three times, and after the image data is completely read out in the subscan direction Y over the whole area, the image data is read out in the main scan direction from the top line again.

When the X and Y sections 408a and 408b of the read area judgment circuit 408 for judging the read area on a copying paper output the Low signals $\overline{REX}$ and $\overline{REY}$ to the X and Y sections 409a and 409b of the read address generating counter 409, respectively, the X and Y sections 409a and 409b generate the address, and the image data stored in the generated address is read out and is sent to the masking circuit 24 through the selector 446. The CPU 25 sets setting values in the X section 408a which can judge that the counting value x is in the range of the read area if $x_s \leq x \leq x_f$, and also the CPU 25 sets setting values in The Y section 408b which can judge that the counting value y is in the range of the read area if $y_s \leq y \leq y_f$. When the counting value of the read address generating counter 409 becomes larger than the value which is the maximum size ($=(x_f-x_s)/3$) of one block, the read address generating counter 409 outputs the overflow signal $X_0$, and starts to count the value from an initial value again, and then, the image data of the same horizontal line is read out. The above process is repeated three times. When the Y section 409b of the read address generating counter 409 counts the value $(y_f-y_s)/9$ in the subscan direction, three blocks of image data has been read out completely, and then, the Y section 409b outputs the overflow signal $Y_0$. Thus, three images are printed in the horizontal direction on a copying paper. The printing operation of three images printed in the horizontal direction is repeated in the subscan direction nine times, and then, the mosaic monitor image comprised of 27 blocks (=3×9) of images has been completely printed on the copying paper.

Figure 15A:
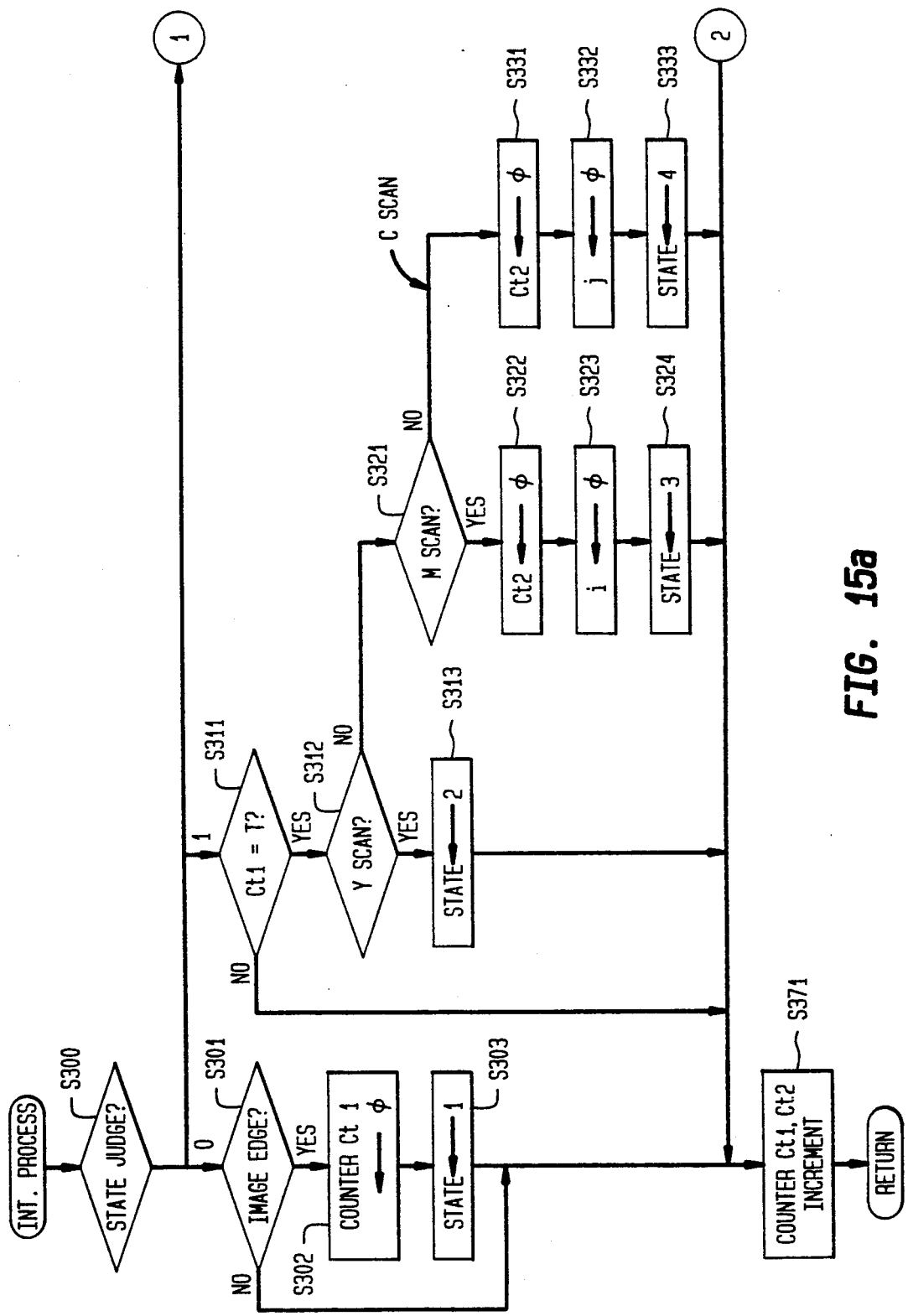
FIGS. 15a and 15b are flow charts of an interruption process of the digital color copying machine.
Figure 15B:
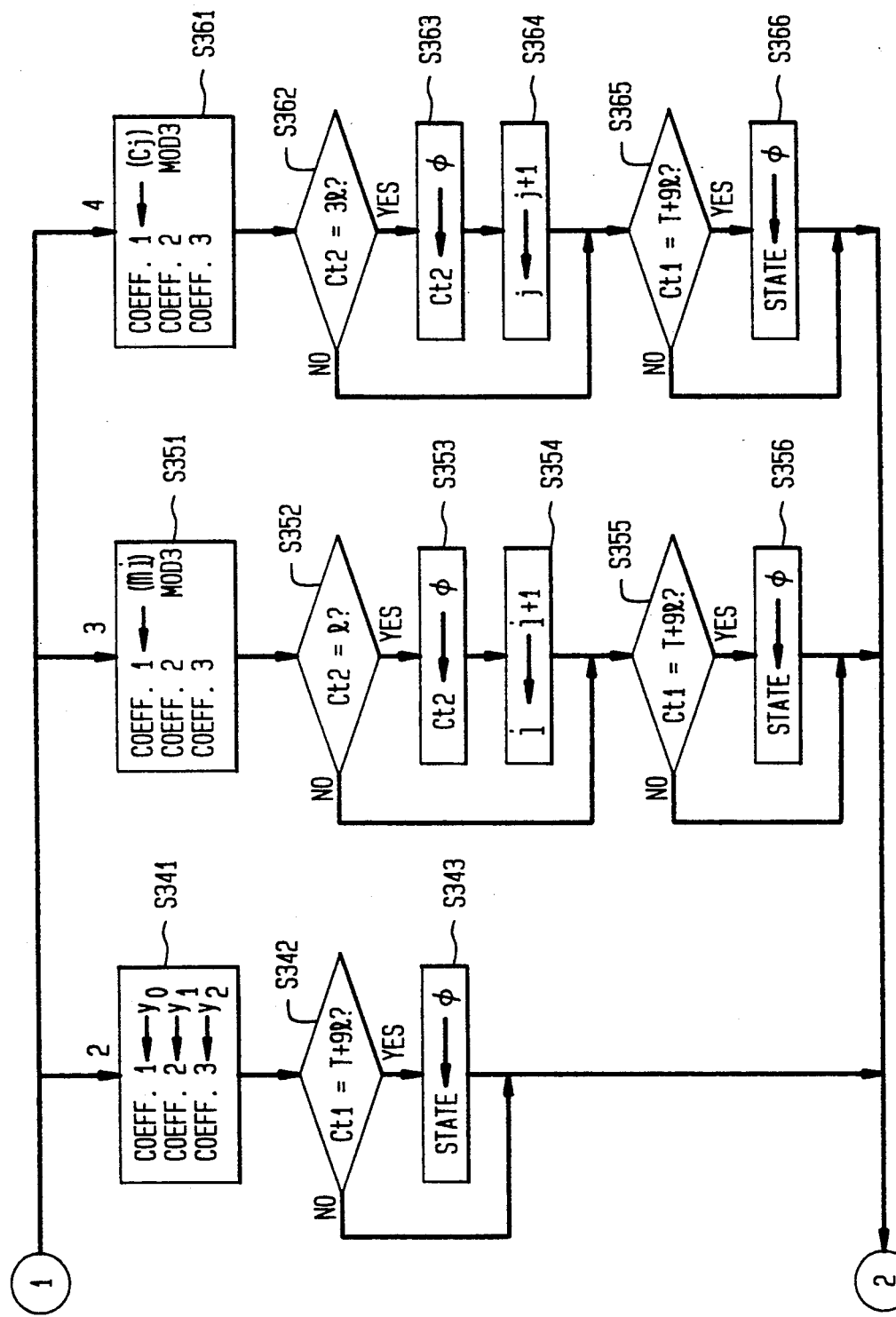

Since different color adjustment coefficients are set at respective blocks of the mosaic monitor image in accordance with the overflow signals $X_0$ and $Y_0$ as shown in FIGS. 15a and 15b, respective images for which different color adjustments are made are printed on the copying paper.

(5) Display of a state of a selected color balance

If respective color adjustment coefficients are displayed in the mosaic monitor mode, it is supposed that the operator can adjust the color balance of an image properly. In the present preferred embodiment, there are provided the color balance memory 36 of a RAM for storing respective color adjustment coefficients of respective colors having been set. In the initial setting process (step S1 of FIG. 12), predetermined standard color adjustment coefficients are stored in the color balance memory 36. Thereafter, in the mosaic monitor mode, when an image having a desirable color balance is selected among the mosaic monitor images, respective color adjustment coefficients of the selected image are stored in the color balance memory 36 at steps S71 and S72 of FIG. 14a, and then, respective color adjustment coefficients Ky, Km and Kc having been stored therein are displayed on the display section 84 of the operation panel 70 at step S111 of FIG. 14b.

FIG. 10 shows an example of respective color adjustment coefficients Ky, Km, Kc and Kk displayed on the display section 84, wherein Kk is a color adjustment coefficient of black color. In the mosaic monitor mode of the present preferred embodiment, each of the color adjustment coefficients $y_2$, $m_2$ and $c_2$ of yellow color (Y), magenta color (M), cyan color (C) is set at +3, each of the color adjustment coefficients $y_1$, $m_1$ and $c_1$ is set at 0, and each of the color adjustment coefficients $y_0$, $m_0$ and $c_0$ is set at −3. FIG. 10 shows the case that the color adjustment coefficients Ky, Km and Kc of a selected desirable image are $y_2$, $m_2$ and $c_0$, respectively. It is to be noted that the color adjustment coefficient Kk of black color is set at a standard level of zero.

Figure 11:
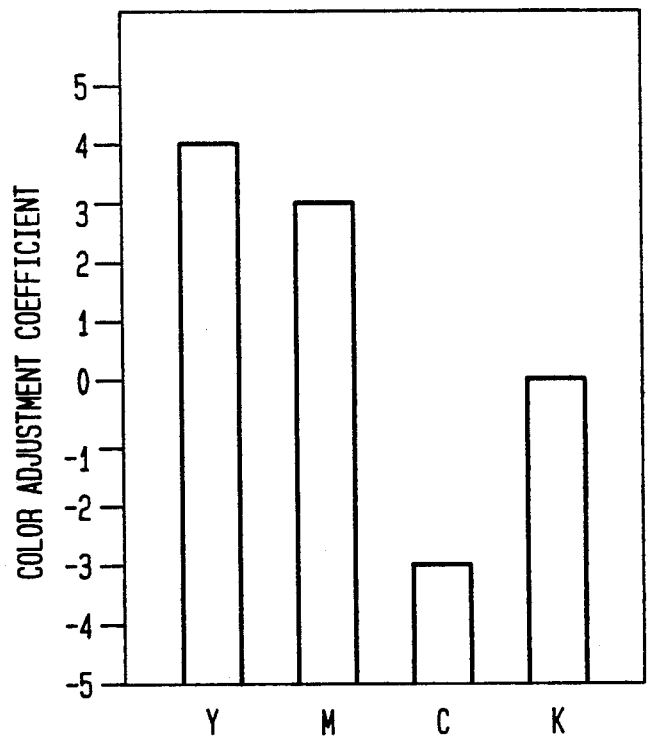
Figure 14A:
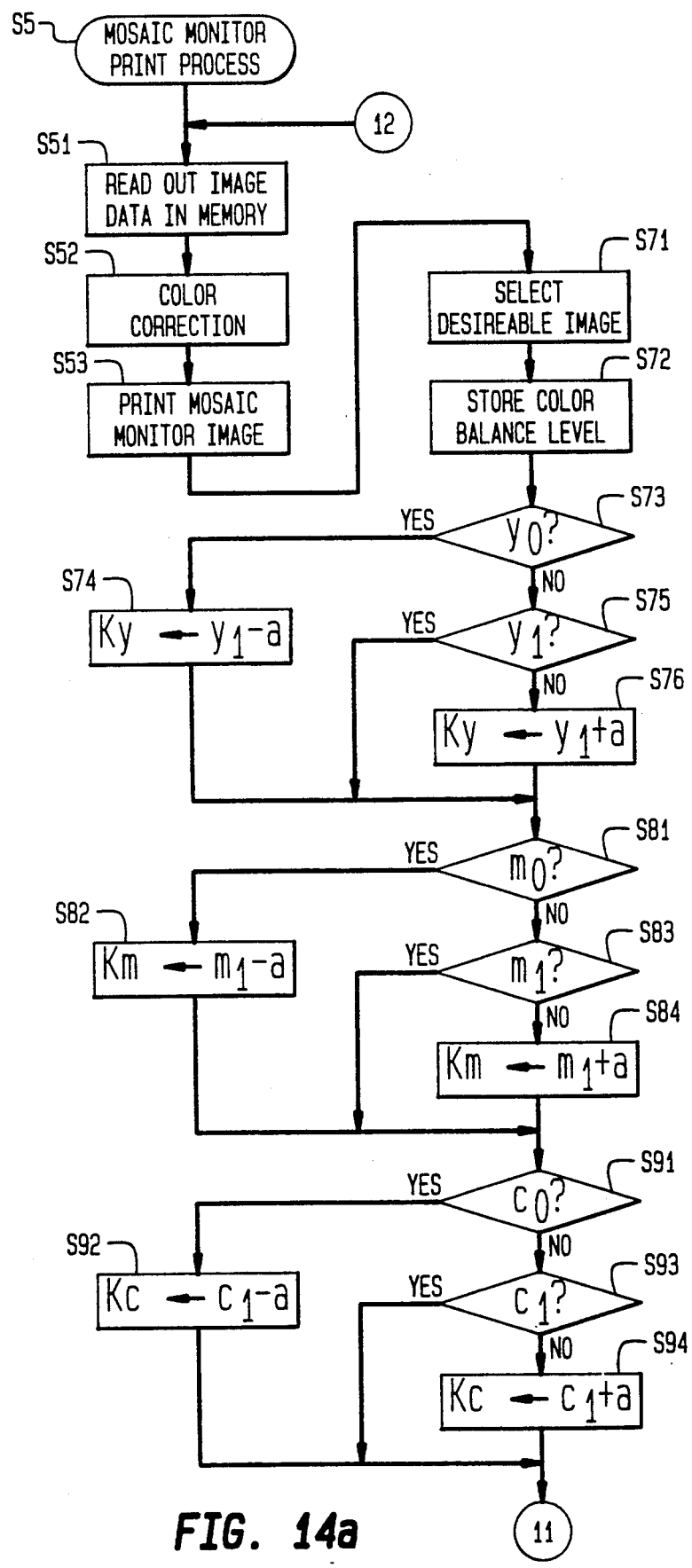
FIGS. 14a and 14b are flow charts of a mosaic monitor image printing process shown in FIG. 12.
Figure 14B:
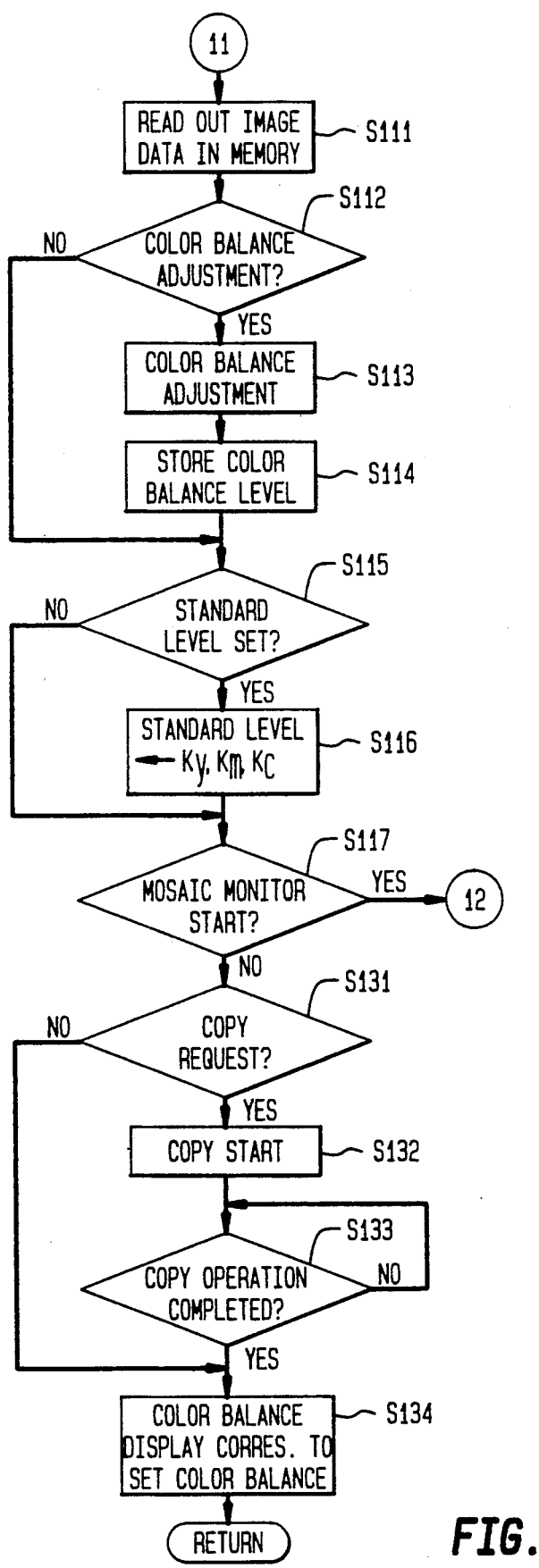

In the present preferred embodiment, the color balance is adjusted at steps S113 and S114 of FIG. 14b even after an image having a desirable color balance is selected among the mosaic monitor images. Upon selecting an image having a desirable color balance among the mosaic monitor images, each of the color adjustment coefficients is adjusted at a unit level of ±3, and in the next adjustment, each of the color adjustment coefficients is adjusted minutely at a unit level of ±1. Thereafter, after performing the copying operation under the condition of the set color balance having respective color adjustment coefficients, respective color adjustment coefficients are displayed on the display section 84 at step S134 of FIG. 14b, as shown in FIG. 11. FIG. 11 shows respective color adjustment coefficients after readjusting the color balance in the case that respective color adjustment coefficients shown in FIG. 10 are set, wherein the color adjustment coefficient of yellow color is increased by one from that shown in FIG. 10 so as to emphasize the yellow color of the image.

As described above, the operator can see the levels of respective color adjustment coefficients of the selected color balance which have been displayed on the display section 84, resulting in that the operator can easily gasp the color balance selected among the mosaic monitor images as an image.

In the present preferred embodiment, as shown in FIGS. 10 and 11, respective color adjustment coefficients of the selected color balance are displayed with use of a bar graph, however, they may be displayed with use of a numerical value.

(6) Control flow in the mosaic monitor mode

Figure 12:
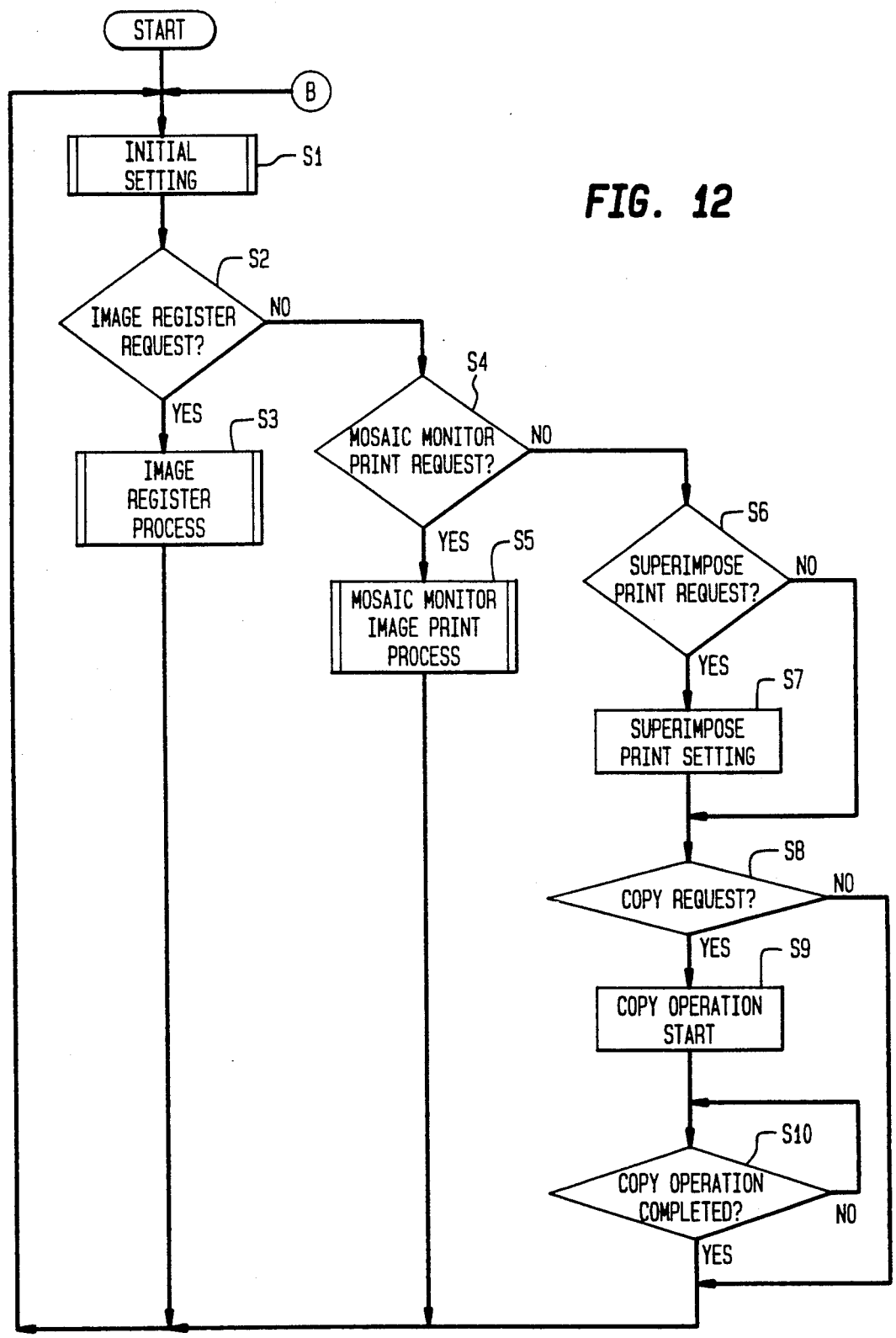
FIG. 12 is a flow chart of a main flow of a mosaic monitor mode of the digital color copying machine shown in FIG. 1.

FIG. 12 is a flow chart of a main flow of the mosaic monitor mode and the superimposing mode performed by the CPU 25 for controlling the digital color copying machine. When the main switch is turned on so that a power is supplied to the digital color copying machine, the CPU 25 and the peripheral units thereof are initialized.

Referring to FIG. 12, first of all, the initial setting process is performed at step S1. Namely, as the condition for the copying operation such as the number of prints, the magnification, the size of the copying paper, an initial condition such as one print, the equal magnification, a mode for automatically selecting the size of the copying paper is set and a standard value is set as the density, and then, the copying operation can be performed. Also, respective color adjustment coefficients of the color balance are set at predetermined standard values, and these coefficients are stored in the color balance memory 36. Furthermore, the mosaic monitor mode etc. can be selected. Thus, the initial mode is set.

Thereafter, various kinds of processes are performed as follows.

When the mosaic monitor mode is selected, an image register process is required (Yes at step S2), and also it is required to print the mosaic monitor image (Yes at step S4). When the superimposing mode is selected, the image register process is required (Yes at step S2), and also it is required to print one image superimposed on another image in the superimposing mode (Yes at step S6).

Figure 13:
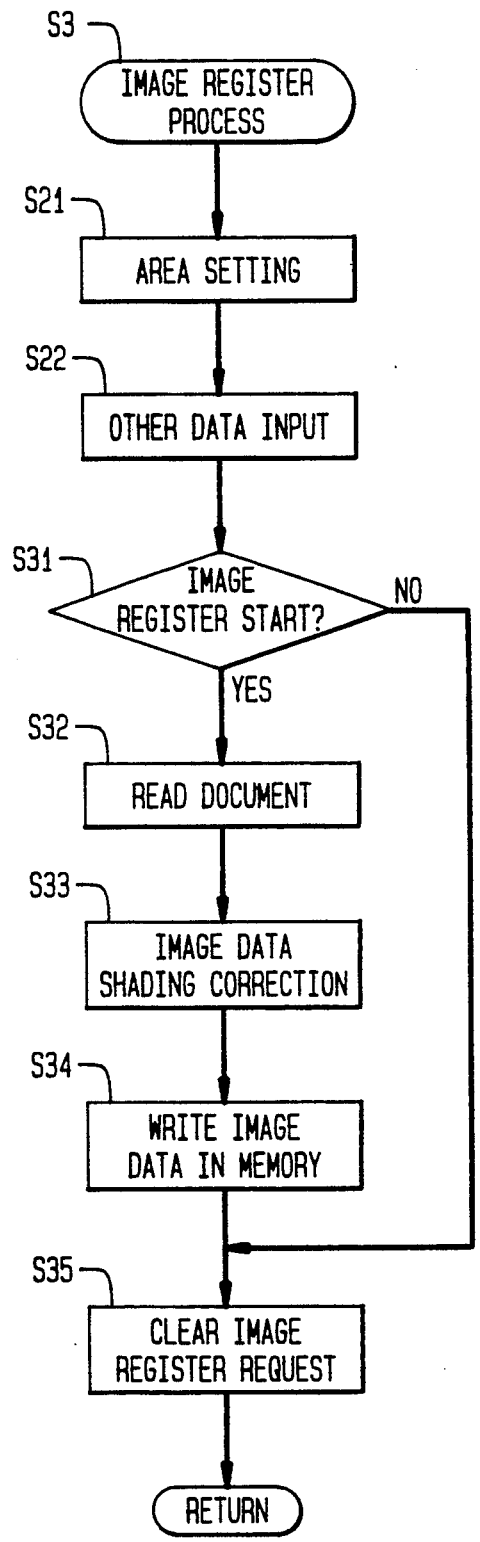
FIG. 13 is a flow chart of an image register process shown in FIG. 10.

If the image register process is required (Yes at step S2), the image register process shown in FIG. 13 is performed at step S3. "The image resister" is to store the image data of the specified area in the RAM 401.

In the above image register process, an image of a document is read by the reading section 100, and the read image is displayed on the display section 84. Thereafter, a specific area EA is set by using the jog dials 82 and 83, and the set key 76, and the address of the specific area EA is outputted to the write area adjustment circuit 402.

If it is required to print the mosaic monitor image on a copying paper (Yes at step S4), the mosaic monitor image printing process shown in FIG. 14 is performed at step S5. In the mosaic monitor printing process, the image data stored in the RAM 401 is read out, and various kinds of color adjustments are made for the read image data, and thereafter, the mosaic monitor image comprised of the images for which the above color adjustments are made is displayed on the display section 84. Then, the copying condition such as the number of prints, the magnification etc. is reset to a predetermined initial state, and the level of the density adjustment is set at a standard level. Thereafter, the operator selects an image having a desirable color tone from the mosaic monitor image displayed on the display section 84, and presses the print start key 71 of the operation panel 70 in order to request a copying operation (Yes at step S8). Then, the copying operation is started at step S9, and when the copying operation is completed (Yes at step S10), the image having the selected color balance is printed on the copying paper.

When it is required to print one image superimposed on another image in the superimposing mode (Yes at step S6), the superimposing printing setting process is performed at step S7. Namely, after checking whether or not the registered image is stored in the RAM 401, the registered image stored therein is read out. Thereafter, when the copying operation is required (Yes at step S8), the copying operation is performed at steps S9 and S10 so as to print the registered image on an image of a document.

If the image register is not required (No at step S2), it is not required to print the mosaic monitor image on a copying paper (No at step S4), and it is not required to print one image superimposed on another image in the superimposing mode (No at step S6), the above copying operation is performed at steps S8 to S10.

FIG. 13 is a flow chart of the image register process (step S3 of FIG. 12).

Referring to FIG. 13, when the set key 76 of operation panel 70 is pressed, the area setting values of the specific area set on the display section 84 are input and set at step S21, and then, the other setting values are input and set at step S22.

Thereafter, it is judged whether or not the image register process is started at step S31. When the image register process is started (Yes at step S31), the coordinates of the top right edge and the bottom left edge of the stored image area are calculated from the area setting values having been input at step S21, and only the document image of the stored image area is read out at step S32. Thereafter, the shading correction is made for the image data of the read document image at step S33, and the corrected image data is stored in the RAM 401 at step S34. Thereafter, it is cleared to request the image resister process at step S35, and then, the program flow returns.

On the other hand, when the image resister process is not started (No at step S31), it is cleared to request the image resister process at step S35, and then, the program flow returns.

FIGS. 14a and 14b are flow charts of the mosaic monitor printing process (S5 of FIG. 12).

Referring to FIG. 14a, first of all, the image data of the specific area stored in the RAM 401 are read out at step S51, the CPU 25 outputs the color adjustment coefficients $y_i$, $m_j$ and $c_k$ to the color tone setting circuit 2, and then, the color adjustment is made for the read image data at step S52. Thereafter, the mosaic monitor images are printed on a copying paper at step S53. Thereafter, when the operator selects a block-shaped image having a desirable color balance among the mosaic monitor images displayed on the display section 84 in the manner as described at the above paragraph (2), the values of i, j and k in the color adjustment coefficients $y_i$, $m_j$ and $c_k$ of the selected image are stored in the memory at step S71. Thereafter, respective color adjustment coefficients of the color balance of the selected image are stored in the color balance memory 36 at step S72, and then, the color adjustment coefficients Ky, Km and Kc corresponding to the selected image are selected.

In the process for setting the color adjustment coefficient Ky of yellow color, first of all, it is judged whether or not the color adjustment coefficient $y_0 = y_1 - a_0$ is selected at step S73, and when the color adjustment coefficient $y_0$ is selected, the color adjustment coefficient Ky is set at a value of $(y_1 - a_0)$ at step S74, and then, the program flow goes to step S81. On the other hand, when the color adjustment coefficient $y_0$ is not selected (No at step S73), it is judged whether or not the color adjustment coefficient $y_1$ is selected at step S75. When the color adjustment coefficient $y_1$ is selected (Yes at step S75), it is not necessary to alter the color adjustment coefficient Ky, and then, the program flow goes to step S81. On the other hand, when the color adjustment coefficient $y_1$ is not selected (No at step S75), the color adjustment coefficient $y_2 = y_1 + a_0$ is selected, and the color adjustment coefficient Ky is set at $(y_1 + a_0)$ at step S76. Thereafter, the program flow goes to step S81.

In the processing for setting the color adjustment coefficient Km of magenta color, first of all, it is judged whether or not the color adjustment coefficient $m_0 = m_1 - a_0$ is selected at step S81, and when the color adjustment coefficient $m_0$ is selected, the color adjustment coefficient Km is set at a value of $(m_1 - a_0)$ at step S82, and then, the program flow goes to step S91. On the other hand, when the color adjustment coefficient $m_0$ is not selected (No at step S81), it is judged whether or not the color adjustment coefficient $m_1$ is selected at step S83. When the color adjustment coefficient $m_1$ is selected (Yes at step S83), it is not necessary to alter the color adjustment coefficient Km, and then, the program flow goes to step S91. On the other hand, when the color adjustment coefficient $m_1$ is not selected (No at step S83), the color adjustment coefficient $m_2 = m_1 + a_0$ is selected, and the color adjustment coefficient Km is set at $(m_1 + a_0)$ at step S84. Thereafter, the program flow goes to step S91.

In the processing for setting the color adjustment coefficient Kc of cyan color, first of all, it is judged whether or not the color adjustment coefficient $c_0 = c_1 - a_0$ is selected at step S91, and when the color adjustment coefficient $c_0 = c_1 - a_0$ is selected, the color adjustment coefficient Kc is set at a value of $(c_1 - a_0)$ at step S92, and then, the program flow goes to step S111. On the other hand, when the color adjustment coefficient $c_0$ is not selected (No at step S91), it is judged whether or not the color adjustment coefficient $c_1$ is selected at step S93. When the color adjustment coefficient $c_1$ is selected (Yes at step S93), it is not necessary to alter the color adjustment coefficient Kc, and then, the program flow goes to step S111. On the other hand, when the color adjustment coefficient $c_1$ is not selected (No at step S93), the color adjustment coefficient $c_2 = c_1 + a_0$ is selected, and the color adjustment coefficient Kc is set at $(c_1 + a_0)$ at step S94. Thereafter, the program flow goes to step S111.

After the color adjustment coefficients Ky, Km and Kc are set and stored in the color balance memory 36 as described above, respective color adjustment coefficients Ky, Km and Kc of the color balance stored therein are read out and are displayed on the display section 84 at step S111, as shown in FIG. 10.

Thereafter, the operator judges whether or not the color balance is to be adjusted by looking at respective color adjustment coefficients thereof displayed on the display section 84. When the adjustment of the color balance is instructed with use of the operation panel 70 (Yes at step S112), the color adjustment coefficients are set at the instructed values, respectively, respective adjustment coefficients Ky, Km and Kc of the color balance having been set are stored in the color balance memory 36 at step S114, and then, the program flow goes to step 115. On the other hand, when the adjustment of the color balance is not instructed (No at step S112), the program flow goes to step S115, directly.

Thereafter, the operator judges whether or not the color adjustment coefficients Ky, Km and Kc are set at the predetermined standard values, respectively, at step S115. When the setting of the color adjustment coefficients Ky, Km and Kc at the predetermined standard values is instructed with use of the operation panel 70 (Yes at step S115), the color adjustment coefficients Ky, Km and Kc are set at the predetermined standard values $y_0$, $m_0$ and $c_0$, respectively, at step S116, and then, the program flow goes to step S117. On the other hand, the setting of the color adjustment coefficients Ky, Km and Kc at the predetermined standard values is not instructed (No at step S115), the program flow goes to step S117, directly.

Thereafter, the operator judges whether or not the mosaic monitor image is printed on a copying paper again at step S117. When start of the mosaic monitor mode is instructed with use of the operation panel 70 (Yes at step S117), the program flow goes back to step S51. At that time, if the standard values of the color adjustment coefficients Ky, Km and Kc have been altered at step S113, the mosaic monitor images having a color balance which is different from that of the mosaic monitor image printed at the last time are printed on a copying paper.

On the other hand, when start of the mosaic monitor mode is not instructed (No at step S117), it is judged whether or not the print start key 71 for instructing the copying operation is pressed at step S131. When the print start key 71 is pressed (Yes at step S131), the document starts to be scanned and the copying operation is started under the condition of the set color adjustment coefficients Ky, Km and Kc at step S132. Thereafter, the copying operation is performed until the copying operation is completed at step S133, and then, the program flow goes to step S134. On the other hand, when the print start key 71 is not pressed (No at step S131), the program flow goes to step S134, directly.

Finally, respective color adjustment coefficients Ky, Km and Kc of the color balance which have been set at present are displayed on the display section 84 at step S134, and then, the operator can grasp respective color adjustment coefficients Ky, Km and Kc of the color balance which have been used in the copying operation of steps S132 and S133.

FIGS. 15a and 15b are flow charts of an interruption process for setting the color adjustment coefficients for making the color adjustment upon printing the mosaic monitor image. This interruption process is performed when the horizontal synchronizing signal Hsync is input to the CPU 25 so that the operation of the CPU 25 is interrupted.

In the interruption process, a counter $Ct_1$ counts a distance in the subscan direction Y from the edge of the image formed on a copying paper P shown in FIG. 7 so as to detect the print start point $P_0$ and the print end point $P_1$ of the mosaic monitor image GM. A counter $Ct_2$ counts a distance in the subscan direction Y so as to detect respective blocks of images of the mosaic monitor image GM. In FIG. 7, T denotes a distance in the subscan direction Y between the edge of the image and the print start point of the mosaic monitor image GM, and l denotes a distance in the subscan direction Y of one block of the images of the mosaic monitor image.

Referring to FIG. 15a, first of all, the program flow goes to either steps S301, S311, S341, S351 or S361 according to a state number at step S300. It is to be noted that the state number is set at "0" at the beginning of the print operation of the mosaic monitor image.

If the state number is "0" at step S300, it is judged whether or not the scanning point of the document has passed through the edge of the image formed on the copying paper P at step S301. When the scanning point has passed through the edge of the image (Yes at step S301), the counting value of the counter $Ct_1$ is initialized at step S302, and the state number is set at "1" at step S303. Thereafter, the program flow goes to step S371. On the other hand, when the scanning point has not passed through the edge of the image (No at step S301), the program flow goes to step S371, directly.

If the state number is "1" at step S300, it is judged whether or not the counting value of the counter $Ct_1$ is equal to a value T at step S311, i.e., the scanning point reaches the position of the coordinate $y_s$ which is the edge of the mosaic monitor image GM. When the counting value of the counter $Ct_1$ is equal to the value T (Yes at step S311), the program flow goes to either one of steps S313, S322 or S331 according to the color of toner supplied by the development units 45a to 45c. That is, when the color of toner is yellow (Yes at step S312), the state number is set at "2" at step S313. When the color of toner is magenta (Yes at step S321), the counting value of the counter $Ct_2$ is initialized at step S322, the variable i is set at "0" at step S323, and then, the state number is set at "3" at step S324. On the other hand, when the counting value of the counter $Ct_1$ is not equal to the value T (No at step S311), the program flow goes to step S371, directly. When the color of toner is cyan (No at step S321), the counting value of the counter $Ct_2$ is initialized at step S331, the variable j is set at "0" at step S332, and the state number is set at "4" at step S333.

If the state number is "2" at step S300, a latch signal is outputted to the color tone setting circuit 2 at step S341 so that the values $y_0$, $y_1$ and $y_2$ are latched as the coefficients 1 to 3 at the latches 302, 303 and 304, respectively, and thereafter, it is judged whether or not the counting value of the counter $Ct_1$ is equal to a value $(T+9l)$ at step S342, i.e., the scanning point reaches the position of the coordinate $y_f$ which is the last edge of the mosaic monitor image GM. When the counting value of the counter $Ct_1$ is equal to the value $(T+9l)$ (Yes at step S342), the state number is set at "0" at step S343, and then, the program flow goes to step S371. On the other hand, when the counting value of the counter $Ct_1$ is not equal to the value $(T+9l)$ (No at step S342), the program flow goes to step S371, directly.

If the state number is "3" at step 300, the value $m_i$ is set as the coefficients 1 to 3 at the latches 302 to 304 at step S351, and it is judged whether or not the counting value of the counter $Ct_2$ is equal to the value l, i.e., the scanning point has passed through one block of image of the mosaic monitor image GM at step 352. If the counting value of the counter $Ct_2$ is equal to the value l (Yes at step S352), the counting value of the counter $Ct_2$ is initialized at step S353, and the variable i is increased by one at step S354. Thereafter, the program flow goes to step S355. On the other hand, if the counting value of the counter $Ct_2$ is not equal to the value l (No at step S352), the program flow goes to step S355, directly. At step S355, it is judged whether or not the counting value of the counter $Ct_1$ is equal to the value (T+91), i.e., the scanning point reaches the last edge of the mosaic monitor image. If the counting value of the counter $Ct_1$ is equal to the value (T+91) (Yes at step S355), the state number is set at "0" at step S356, and the program flow goes to step S371. On the other hand, if the counting value of the counter $Ct_1$ is not equal to the value (T+91) (No at step S355), the program flow goes to step S371, directly. That is, in the process of the state number "3", the same value $m_i$ is set at the coefficients 1 to 3, and also the coefficients 1 to 3 are altered to the new value $m_{i+1}$ every time the scanning point reaches the next block of image of the mosaic monitor image in the subscan direction Y.

If the state number is "4" at step 300, the value $c_j$ is set as the coefficients 1 to 3 at the latches 302 to 304 at step 361, it is judged whether or not the counting value of the counter $Ct_2$ is equal to a value (3l), i.e., the scanning point has passed through three blocks of images of the mosaic monitor monitor image at step S362. If the counting value of the counter $Ct_2$ is equal to the value (3l) (Yes at step S362), the counter $Ct_2$ is initialized at step S363, and the variable j is increased by one at step S364, and thereafter, the program flow goes to step S365. On the other hand, if the counting value of the counter $Ct_2$ is not equal to the value (3l) (No at step S362), the program flow goes to step S365, directly.

At step S365, it is judged whether or not the counting value of the counter $Ct_1$ is equal to the value (T+91), i.e., the scanning point reaches the last edge of the mosaic monitor image at step S365. If the counting value of the counter $Ct_1$ is equal to the value (T+91) (Yes at step S365), the state number is set at "0" at step S366, and then, the program flow goes to step S371. On the other hand, if the counting value of the counter $Ct_1$ is not equal to the value (T+91) (No at step S365), the program flow goes to step S371, directly. In the above process of the state number "4", the same value $c_j$ is set as the coefficients 1 to 3 at the latches 302 to 304, and the coefficients 1 to 3 are altered to the new value $c_{j+1}$ every time the scanning point passes through three blocks of images of the mosaic monitor image in the subscan direction Y.

After respective above processes of the state numbers "1" to "4", respective counting values of the counters $Ct_1$ and $Ct_2$ are increased by one at step S371, and then, the program flow returns. When the above processes are completed, various coefficients are set at respective blocks of images corresponding to respective printing colors so that the color adjustment has been made for the mosaic monitor image.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A digital color copying machine comprising:
   image reading means for scanning an original document image and generating image data;
   color correcting means for making a color correction for said image data;
   image forming means for forming the original document image on a recording medium in response to the image data corrected by said color correcting means;
   mode selecting means for selecting a test mode;
   area indicating means for indicating a partial area of the original document image;
   memory means for storing the image data corresponding to the partial area indicated by said area indicating means;
   control means for controlling said image forming means so as to form plural test images of the indicated partial area having different color balances on said recording medium by reading out said image data stored in said memory means when the test mode is selected and applying said read out image data to said color correcting means in order to make a color correction thereof with a color balance selected among predetermined color balances;
   image selecting means for selecting any one of said plural test images formed by said control means; and
   indicating means for indicating the state of the color balance with which the color correction is made for one of said plural test images selected by said image selecting means.

2. The digital color copying machine as claimed in claim 1, further comprising an additional control means for controlling said color correcting means so as to make the color correction for the entire original document image with a color balance with which the color correction is made for one of said plural test images selected by said image selecting means, thereby performing a copying operation under the condition of the selected color balance.

3. The digital color copying machine as claimed in claim 2, wherein said indicating means indicates color adjustment coefficients of respective colors of the selected color balance.

4. The digital color copying machine as claimed in claim 3, wherein said control means forms plural test images of the indicated partial area having different color balances in a form of a matrix on the same recording medium.

5. The digital color copying machine as claimed in claim 1, further comprising:
   altering means for altering the color balance indicated by said indicating means;
   an additional control means for controlling said color correcting means so as to make the color correction for the entire original document image with the color balance altered by said altering means, thereby performing a copying operation under the condition of the altered color balance; and
   an additional indicating means for indicating the state of the color balance altered by said altering means.

6. A digital color copying machine comprising:
   image reading means for scanning an original document image and generating image data;
   color adjusting means for adjusting a color balance of the image data generated by said image reading means;
   image forming means for forming the original document image on a recording medium in response to the image data adjusted by said color adjusting means;

test image forming means for making plural color adjustments with different color balances for a partial specific area of the original document image respectively by said color adjusting means, thereby forming plural test images having different color balances at different positions on a recording medium;

image selecting means for selecting any one of said plural test images formed by said test image forming means; and indicating means for indicating the state of the color balance with which the color correction is made for said one of said plural test images selected by said image selecting means.

7. The digital color copying machine as claimed in claim 6, wherein said indicating means indicates color adjustment coefficients of respective colors of the selected test image.

8. The digital color copying machine as claimed in claim 7, further comprising means for controlling said color adjusting means so as to make the color adjustment for the entire original document image with a color balance with which the color adjustment is made for one of said plural test images selected by said image selecting means, thereby performing a copying operation under the condition of the selected color balance.

9. The digital color copying machine as claimed in claim 8, wherein said test image forming means forms plural test images of the partial specific area for which the color adjustment is made with different color balances in a form of a matrix on the same recording medium.

10. The digital color copying machine as claimed in claim 6, further comprising:

altering means for altering the color balance indicated by said indicating means;

an additional control means for controlling said color adjusting means so as to make the color adjustment for the entire original document image with the color balance altered by said altering means, thereby performing a copying operation under the condition of the altered color balance; and an additional indicating means for indicating the state of the color balance altered by said altering means.

11. An image recording apparatus for forming an image on a recording medium in accordance with image data comprising:

color adjusting means for making different color adjustments for the image data and generating adjusted image data having different color balances;

image forming means for forming plural test images respectively having different color balances at different positions of a recording medium in accordance with the image data adjusted by said color adjusting means;

image selecting means for selecting any one of said plural test images formed by said image forming means;

means for controlling said color adjusting means so as to make the color adjustment for the entire original document image with a color balance with which the color adjustment is made for one of plural test images selected by said image selecting means, thereby performing a copying operation under the condition of the of the selected text image color balance; and indicating means for indicating the state of the color balance with which the color correction is made for said one of said plural test images selected by said image selecting means.

12. The image recording apparatus as claimed in claim 11, wherein said indicating means indicates color adjustment coefficients of respective colors of the selected color balance.

13. An image recording apparatus for forming an image on a recording medium in accordance with image data comprising:

color adjusting means for adjusting a color balance determined by a set of parameters by calculating the image data;

means for providing the image data corresponding to a partial specific part of an entire image to said color adjusting means repeatedly;

varying means for automatically varying the parameters for the calculation of said color adjusting means according to a predetermined varying manner in synchronization with the operation of said providing means;

image forming means for forming plural test images corresponding to the partial specific part under the condition of different color balances on a recording medium responsive to the image data adjusted by said color adjusting means;

image selecting means for selecting any one of said plural test images formed by said image forming means;

latching means for latching the parameters used in the color balance adjustment of said color adjusting means, thereby adjusting a color balance for the image data of the entire image under the condition of the latched parameters and performing a recording operation for the entire image; and indicating means for indicating the parameters used in the color balance adjustment of said color adjusting means with which the selected image has been subjected.

14. The image recording apparatus as claimed in claim 11, wherein said indicating means indicates color adjustment coefficients of respective colors of the selected test image.

* * * * *